US012722357B2

(12) United States Patent
Chonan et al.

(10) Patent No.: US 12,722,357 B2
(45) Date of Patent: Sep. 1, 2026

(54) PRINTED MATERIAL AND METHOD FOR PRODUCING PRINTED MATERIAL

(71) Applicant: FUJIFILM Business Innovation Corp., Tokyo (JP)

(72) Inventors: Shiori Chonan, Kanagawa (JP); Satoshi Kamiwaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 507 days.

(21) Appl. No.: 17/508,394

(22) Filed: Oct. 22, 2021

(65) Prior Publication Data

US 2022/0305832 A1 Sep. 29, 2022

(30) Foreign Application Priority Data

Mar. 29, 2021 (JP) ................................ 2021-055131

(51) Int. Cl.
*B32B 7/12* (2006.01)
*B31D 1/00* (2017.01)
(Continued)

(52) U.S. Cl.
CPC .................. *B32B 7/12* (2013.01); *B31D 1/00* (2013.01); *B32B 37/10* (2013.01); *B32B 37/24* (2013.01);
(Continued)

(58) Field of Classification Search
CPC .. B31D 1/00; B32B 7/12; B32B 37/10; B32B 37/24; B32B 2307/4023; B32B 2309/12;
(Continued)

(56) References Cited

U.S. PATENT DOCUMENTS

| | | | |
|---|---|---|---|
| 2014/0042213 | A1 | 2/2014 | Mehta |
| 2019/0292412 | A1 | 9/2019 | Yamasaki et al. |
| 2021/0017424 | A1 | 1/2021 | Ishizuka et al. |

FOREIGN PATENT DOCUMENTS

| | | | |
|---|---|---|---|
| JP | 2008-169284 | A | 7/2008 |
| JP | 2008-170659 | A | 7/2008 |

(Continued)

OTHER PUBLICATIONS

Machine Translation of WO-2018142820-A1 (Year: 2018).*

(Continued)

*Primary Examiner* — Sathavaram I Reddy
(74) *Attorney, Agent, or Firm* — Sughrue Mion, PLLC

(57) ABSTRACT

A printed material includes: a recording medium having a pressure-bonding surface on which an image portion and a pressure phase transition layer are formed, the recording medium being folded upon the recording medium and pressure-bonded; or a recording medium having a pressure-bonding surface on which an image portion and a pressure phase transition layer are formed and an additional recording medium, the recording medium and the additional recording medium being stacked and pressure-bonded together. The average thickness of the pressure phase transition layer formed on the image portion on the pressure-bonding surface of the recording medium is larger than the average thickness of the pressure phase transition layer formed on a non-image portion on the pressure-bonding surface of the recording medium.

8 Claims, 3 Drawing Sheets

(51) Int. Cl.

| | |
|---|---|
| ***B32B 37/10*** | (2006.01) |
| ***B32B 37/24*** | (2006.01) |
| ***B41M 7/00*** | (2006.01) |
| ***B42D 15/02*** | (2006.01) |
| ***B42D 15/04*** | (2006.01) |
| ***C09J 125/14*** | (2006.01) |
| ***C09J 133/08*** | (2006.01) |

(52) U.S. Cl.
CPC ........... *B41M 7/0027* (2013.01); *B42D 15/02* (2013.01); *B42D 15/04* (2013.01); *C09J 125/14* (2013.01); *C09J 133/08* (2013.01); *B32B 2307/4023* (2013.01); *B32B 2309/12* (2013.01); *B41M 2205/40* (2013.01)

(58) Field of Classification Search
CPC . B32B 2205/40; B41M 7/0027; B41M 15/02; B41M 15/04; C09J 125/14; C09J 133/08
See application file for complete search history.

(56) References Cited

FOREIGN PATENT DOCUMENTS

| | | | | |
|---|---|---|---|---|
| JP | 2008-173831 A | | 7/2008 | |
| JP | 2019-167471 A | | 10/2019 | |
| JP | 2021-17465 A | | 2/2021 | |
| WO | WO-2018142820 A1 | * | 8/2018 | ............... B05B 1/00 |

OTHER PUBLICATIONS

Extended European Search Report issued Jun. 1, 2022 in European Application No. 21211689.1.
Notice Of Reasons for Refusal dated Oct. 15, 2024 in Application No. 2021-055131.
Communication dated Jan. 31, 2026 in Chinese Application No. 202111494947.9.

* cited by examiner 300
10K
10C
10M
10Y
10T
8K
8C
8M
8Y
8T
2K
3K
4K
1K
5K
6K
2C
3C
4C
1C
5C
6C
2M
3M
4M
1M
5M
6M
2Y
3Y
4Y
1Y
5Y
6Y
2T
3T
4T
1T
5T
6T
20
21
22
23
24
26
28
P
P
P4
2
200
220
230
231
232
P4
P5
P6
2

PRINTED MATERIAL AND METHOD FOR PRODUCING PRINTED MATERIAL

CROSS-REFERENCE TO RELATED APPLICATIONS

This application is based on and claims priority under 35 USC 119 from Japanese Patent Application No. 2021-055131 filed Mar. 29, 2021.

BACKGROUND

(i) Technical Field

The present disclosure relates to a printed material and a method for producing the printed material.

(ii) Related Art

Japanese Unexamined Patent Application Publication No. 2008-170659 discloses "a powder fixing agent that can be applied to a paper sheet through a developing step using an electrophotographic method, a transferring step, and a fixing step and contains a cyclic polyolefin resin as a main structure in an amount of 40% or more and a thermoplastic elastomer in an amount of 30% or more."

Japanese Unexamined Patent Application Publication No. 2008-173831 discloses "a pressure-bonded printed material production apparatus that pressure-bonds pressure-bonding surfaces of a sheet-shaped printed medium for a pressure-bonded printed material with variable information printed thereon with a toner to complete the pressure-bonded printed material, the pressure-bonded printed material production apparatus including at least: fixing agent applying means for applying a powder fixing agent to a prescribed surface of the sheet-shaped printed medium with the variable information printed thereon with the toner; and a print region setting means for setting an application region of the powder fixing agent applied by the fixing agent applying means and a print region in which the variable information is printed such that the print region is smaller in area than the application region."

SUMMARY

Aspects of non-limiting embodiments of the present disclosure relate to a printed material including: a recording medium having a pressure-bonding surface on which an image portion and a pressure phase transition layer are formed, the recording medium being folded upon the recording medium and pressure-bonded; or a recording medium having a pressure-bonding surface on which an image portion and a pressure phase transition layer are formed and an additional recording medium, the recording medium and the additional recording medium being stacked and pressure-bonded together. In the printed material, unevenness in pressure-bonding strength between the pressure-bonded surfaces is smaller than that when the average thickness of the pressure phase transition layer formed on the image portion on the pressure-bonding surface of the recording medium is the same as the average thickness of the pressure phase transition layer formed on a non-image portion on the pressure-bonding surface of the recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printed material including: a recording medium having a pressure-bonding surface on which an image portion and a pressure phase transition layer are formed, the recording medium being folded upon the recording medium and pressure-bonded; or a recording medium having a pressure-bonding surface on which an image portion and a pressure phase transition layer are formed and an additional recording medium, the recording medium and the additional recording medium being stacked and pressure-bonded together, wherein the average thickness of the pressure phase transition layer formed on the image portion on the pressure-bonding surface of the recording medium is larger than the average thickness of the pressure phase transition layer formed on a non-image portion on the pressure-bonding surface of the recording medium.

BRIEF DESCRIPTION OF THE DRAWINGS

Exemplary embodiments of the present disclosure will be described in detail based on the following figures, wherein.

DETAILED DESCRIPTION

Figure 1:
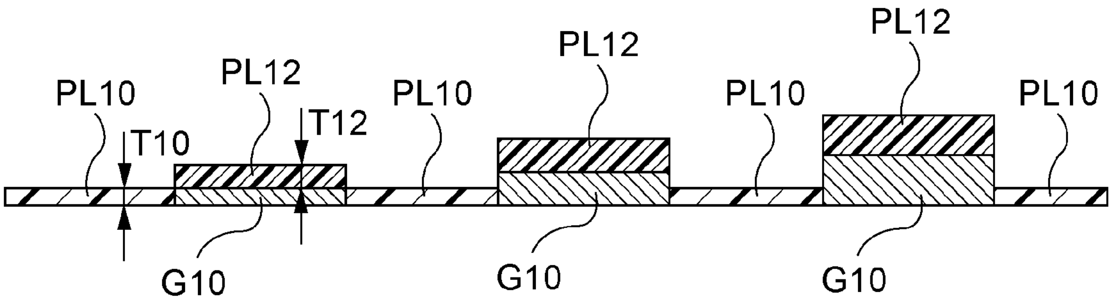
FIG. 1 is a schematic partial cross-sectional view showing an example of a recording medium to be subjected to pressure-bonding and used to produce a printed material according to an exemplary embodiment.

Exemplary embodiments of the present disclosure will next be described. The following description and Examples are illustrative of the exemplary embodiments and are not intended to limit the scope of the exemplary embodiments.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value shown in an Example.

In the present specification, the term "step" is meant to include not only an independent step but also a step that is not clearly distinguished from other steps, so long as the prescribed purpose of the step can be achieved.

In the present specification, when an exemplary embodiment is explained with reference to the drawings, the structure of the exemplary embodiment is not limited to the structure shown in the drawings. In the drawings, the sizes of the components are conceptual, and the relative relations between the components are not limited to these relations.

In the present specification, any component may include a plurality of materials corresponding to the component. In the present specification, when reference is made to the amount of a component in a composition, if the composition contains a plurality of materials corresponding to the component, the amount means the total amount of the plurality of materials, unless otherwise specified.

In the present specification, particles corresponding to a certain component may include a plurality of types of particles. When a plurality of types of particles corresponding to a certain component are present in a composition, the particle diameter of the component is the value for the mixture of the plurality of types of particles present in the composition, unless otherwise specified.

In the present specification, the notation "(meth)acrylic" is meant to include "acrylic" and "methacrylic."

In the present specification, "peel strength" is an index indicating the degree of peeling between surfaces of a recording medium(s) facing each other (i.e., pressure-bonded surfaces) and has substantially the same meaning as "pressure-bonding strength" indicating the degree of pressure-bonding. When the term "peel strength" is simply used, the "peel strength" represents the peel strength between the surfaces of the recording medium(s) facing each other (i.e., the pressure-bonded surfaces). When the term "pressure-bonding strength" is simply used, the pressure-bonding strength represents the pressure-bonding strength between the surfaces of the recording medium(s) facing each other (i.e., the pressure-bonded surfaces).

[Printed Material]

A printed material according to an exemplary embodiment is a printed material that includes: a recording medium having a pressure-bonding surface on which an image portion and a pressure phase transition layer are formed, the recording medium being folded upon itself and pressure-bonded; or a recording medium having a pressure-bonding surface on which an image portion and a pressure phase transition layer are formed and an additional recording medium, the recording medium and the additional recording medium being stacked and pressure-bonded together, wherein the average thickness of the pressure phase transition layer formed on the image portion on the pressure-bonding surface of the recording medium is larger than the average thickness of the pressure phase transition layer formed on a non-image portion on the pressure-bonding surface of the recording medium.

The "additional recording medium" is a recording medium having a surface on which an image portion and a pressure phase transition layer is formed, and this surface serves as a pressure-bonding surface.

The printed material obtained by folding a recording medium upon itself and pressure-bonding the folded recording medium and the printed material obtained by stacking a recording medium and an additional recording medium together and pressure-bonding the stacked recording mediums are collectively referred to as a "pressure-bonded printed material."

In the printed material according to the present exemplary embodiment having the above structure, unevenness in pressure-bonding strength between the pressure-bonded surfaces is small. The reason for this may be as follows.

In one known printed material, a recording medium having, as a pressure-bonding surface, a surface to which an UV varnish or an aqueous varnish is applied is folded upon itself and pressure-bonded, or a recording medium and an additional recording medium each having, as a pressure-bonding surface, a surface to which an UV varnish or an aqueous varnish is applied are stacked together and pressure-bonded together.

Another known printed material includes a recording medium having, as a pressure-bonding surface, a surface on which an image portion and a pressure phase transition layer are formed and is obtained by folding the recording medium upon itself and subjecting the folded recording medium to pressure-bonding or includes a recording medium and an additional recording medium each having, as a pressure-bonding surface, a surface on which an image portion and a pressure phase transition layer are formed and is obtained by staking the additional recording medium on the recording medium and subjecting the stacked mediums to pressure-bonding together.

However, in these printed materials, unevenness in the pressure-bonding strength between the pressure-bonded surfaces occurs, and this may cause local breakage or peeling. This may be due to a reduction in the pressure-bonding strength in the image portion on the pressure-bonding surface.

Therefore, in the printed material according to the present exemplary embodiment, the average thickness of the pressure phase transition layer formed on the image portion on the pressure-bonding surface of the recording medium is larger than the average thickness of the pressure phase transition layer formed on the non-image portion. In this case, a reduction in the pressure-bonding strength in the image portion on the pressure-bonded surfaces is prevented, so that the unevenness in the pressure-bonding strength between the pressure-bonded surfaces is reduced.

It is therefore inferred that, in the printed material according to the present exemplary embodiment having the above structure, the unevenness in the pressure-bonding strength between the pressure-bonded surfaces is reduced.

A printed material folded in three and pressure-bonded, e.g., a Z-folded pressure-bonded printed material, has an advantage in that the amount of information printed is larger than that printed on a printed material folded in half and pressure-bonded, e.g., a V-folded pressure-bonded printed material. However, since the Z-folded pressure-bonded printed material has four pressure-bonded surfaces, the influence of the unevenness in the pressure-bonding strength between the pressure-bonded surfaces is large, and local breakage or peeling is likely to occur.

However, even when the printed material according to the present exemplary embodiment is a printed material folded in three and pressure-bonded such as a Z-folded pressure-bonded printed material, the unevenness in the pressure-bonding strength between the pressure-bonded surfaces is reduced, and local breakage or peeling is prevented.

The details of the printed material according to the present exemplary embodiment will be described.

(Image Portion, Pressure Phase Transition Layer, and Recording Medium)

Examples of the image portion include toner image portions formed on recording mediums using an electrophotographic system and ink image portions formed on recording mediums using an inkjet system. In particular, when the image portion is a toner image portion, a reduction in the pressure-bonding strength tends to occur, and the unevenness in the pressure-bonding strength between the pressure-bonded surfaces tends to occur. However, in the present exemplary embodiment, the unevenness in the pressure-bonding strength between the pressure-bonded surfaces is reduced.

Examples of the pressure phase transition layer include a layer formed by placing pressure phase transition particles on a recording medium and fixing the pressure phase transition particles.

Examples of the recording medium include paper sheets, coated paper sheets obtained by coating paper sheets with resins etc., fabrics, nonwoven fabrics, resin films, and resin sheets.

The details of the image portion and the pressure phase transition layer will be described later in the description of a printed material production method.

(Thickness of Pressure Phase Transition Layer)

In the printed material according to the present exemplary embodiment, the average thickness of the pressure phase transition layer formed on the image portion on the pressure-bonding surface of the recording medium is larger than the average thickness of the pressure phase transition layer formed on the non-image portion (see FIG. 1).

In FIG. 1, G10 represents the image portion, and PL10 represents the pressure phase transition layer formed on the non-image portion. PL12 represents the pressure phase transition layer formed on the image portion. T10 represents the thickness of the pressure phase transition layer formed on the non-image portion, and T12 represents the thickness of the pressure phase transition layer formed on the image portion.

FIG. 1 is a schematic partial cross-sectional view showing an example of a recording medium to be Z-folded and pressure-bonded to produce a printed material.

Specifically, from the viewpoint of reducing the unevenness in the pressure-bonding strength between the pressure-bonded surfaces, the thickness of the pressure phase transition layer formed on the image portion may increase as the thickness of the image portion increases. This is because, as the thickness of the image portion increases, the pressure-bonding strength tends to decrease.

More specifically, the average thickness of the pressure phase transition layer formed on the image portion is from 0.5 μm to 5.0 μm inclusive, and the average thickness of the image portion is more than 0 μm and 5.0 μm or less. When the thickness BR of the image portion is 0.5 μm or less, the following formulas (1) to (3) may be satisfied.

$$AR = X1 \times BR + Y1 \quad \text{Formula (1):}$$

$$2 \leq X1 \leq 10 \quad \text{Formula (2):}$$

$$0.5 \leq Y1 \leq 2 \quad \text{Formula (3):}$$

(In formula (1), AR is the thickness (μm) of the pressure phase transition layer formed on the image portion, and BR is the thickness (μm) of the image portion. The thicknesses represented by AR and BR are the thickness of the pressure phase transition layer directly above the image portion and the thickness of the image portion directly below the pressure phase transition layer whose thickness is determined, respectively.)

When the average thickness of the pressure phase transition layer formed on the image portion and the average thickness of the image portion are within the above ranges and the thickness BR of the image portion is 0.5 μm or less, a reduction in the pressure-bonding strength in the image portion is prevented when formulas (1) to (3) are satisfied.

However, when the thickness of the image portion exceeds 0.5 μm, the increase in the pressure-bonding strength is saturated, and it may be unnecessary to change the thickness of the pressure phase transition layer.

From the viewpoint of reducing the unevenness in the pressure-bonding strength between the pressure-bonded surfaces, the value of X1 in formula (2) is preferably from 2.5 to 7 inclusive and more preferably from 3 to 5 inclusive.

From the same point of view, the value of Y1 in formula (3) is preferably from 0.7 to 1.4 inclusive and more preferably from 0.8 to 1.3 inclusive.

The thickness of the pressure phase transition layer and the thickness of the image portion are measured as follows.

The pressure-bond of a printed material is released to unfold the printed material (i.e., the pressure-bonded surfaces of the printed material are peeled off from each other), and a sample for cross-sectional observation is collected from the unfolded medium.

The sample used is cut such that the image portion and the non-image portion whose cross sections are to be observed are located in an edge portion, and the cross sections are observed under a laser microscope.

The thickness of the pressure phase transition layer is measured at 5 points, and the average of the measured thicknesses is used as the "thickness of the pressure phase transition layer formed on the non-image portion."

The thickness of the image portion is measured at 5 points, and the average of the measured thicknesses is used as the "average thickness of the image portion."

Whether or not formula (1) is satisfied is checked as follows. The thickness of the image portion and the thickness of the pressure phase transition layer formed on the image portion are measured at 3 points at which the thicknesses of the image portion differ from each other. The thicknesses are plotted with the vertical axis representing the thickness of the pressure phase transition layer and the horizontal axis representing the thickness of the image portion to draw a graph.

(Coverage with Pressure Phase Transition Layer)

The coverage of the image portion with the pressure phase transition layer formed thereon may be from 60% to 100% inclusive.

When the coverage of the image portion with the pressure phase transition layer formed thereon is in the above range, the surface of the sheet can be sufficiently covered with the pressure phase transition layer. Therefore, the unevenness in the pressure-bonding strength between the pressure-bonded surfaces can be easily reduced.

The coverage of the non-image portion with the pressure phase transition layer formed thereon is preferably from 10% to 60% inclusive, more preferably from 15% to 55% inclusive, and still more preferably from 20% to 50% inclusive.

When the coverage of the non-image portion with the pressure phase transition layer formed thereon is in the above range, the surface of the sheet can be appropriately covered with the pressure phase transition layer. Therefore, the unevenness in the pressure-bonding strength between the pressure-bonded surfaces can be easily reduced.

The coverage with the pressure phase transition layer is measured as follows.

A sample is collected from a portion in which the pressure phase transition layer is formed and observed, for example, under an SEM at a magnification of 1000× to obtain an observation image. The image obtained is subjected to a binarizing process to extract the pressure phase transition layer, and the ratio of the pressure phase transition layer to the total area is measured. This procedure is performed at 3 points, and the average of the measurements is used as the coverage.

(Modes of Printed Material)

Examples of the printed material according to the present exemplary embodiment include: a printed material that includes a recording medium having a pressure-bonding surface on which an image portion and the pressure phase transition layer are formed, the recording medium being folded upon itself and pressure-bonded (e.g., a printed material folded in three such as a Z-folded printed material or a printed material folded in half such as a V-folded printed material); and a printed material that includes a recording medium having a pressure-bonding surface on which an image portion and a pressure phase transition layer are formed and an additional recording medium, the recording medium and the additional recording medium being stacked and pressure-bonded together.

Representative examples of the printed material according to the present exemplary embodiment include pressure-bonded postcards.

[Printed Material Production Method and Printed Material Production System]

A printed material production method according to an exemplary embodiment includes the steps of:

placing pressure phase transition particles on a recording medium having an image portion formed thereon;

fixing at least the pressure phase transition particles to the recording medium to thereby form a pressure phase transition layer; and pressure-bonding the recording medium folded upon itself such that a surface of the recording medium that has formed thereon the image portion and the pressure phase transition layer serves as a pressure-bonding surface or pressure-bonding the recording medium and an additional recording medium stacked together such that a surface of the recording medium that has formed thereon the image portion and the pressure phase transition layer serves as a pressure-bonding surface.

In the printed material production method according to the present exemplary embodiment, to produce the printed material according to the preceding exemplary embodiment, the amount of the pressure phase transition particles placed on the image portion is larger than the amount of the pressure phase transition particles placed on the non-image portion.

The printed material production method according to the present exemplary embodiment is performed using a printed material production system according to an exemplary embodiment shown below.

The printed material production system according to the present exemplary embodiment includes:

a pressure phase transition particle placing unit that contains pressure phase transition particles and places the pressure phase transition particles on a recording medium having an image portion formed thereon;

a fixing unit that fixes at least the pressure phase transition particles to the recording medium to form a pressure phase transition layer; and a pressure-bonding unit that folds the recording medium upon itself such that its surface having formed thereon the image portion and the pressure phase transition layer serves as a pressure-bonding surface and then pressure-bonds the folded recording medium or that stacks the recording medium on an additional recording medium such that the surface of the recording medium on which the image portion and the pressure phase transition layer have been formed serves as a pressure-bonding surface and then pressure-bonds the recording medium and the additional recording medium together.

No particular limitation is imposed on the image portion so long as it is a region with a chromatic color image formed therein and is an image containing a coloring material. Examples of the image portion include an image having an average light transmittance of less than 90% in the visible range (from 400 nm to 700 nm inclusive). The average light transmittance of the chromatic color image is preferably less than 50% and more preferably less than 10%. The average transmittance is measured using a spectrophotometer V700 (manufactured by JASCO Corporation).

The "pressure phase transition layer" and the "pressure phase transition particles" are a layer and particles that undergo pressure-induced phase transition and are specifically a layer and particles satisfying the following formula 1.

$$10° \text{ C.} \le T1 - T2 \qquad \text{Formula 1}$$

In formula 1, T1 is the temperature at which their viscosity at a pressure of 1 MPa is 10000 Pa·s, and T2 is the temperature at which the viscosity at a pressure of 10 MPa is 10000 Pa·s. A method for determining the temperatures T1 and T2 will be described later.

The "pressure phase transition layer" and the "pressure phase transition particles" may contain a styrene-based resin containing styrene and an additional vinyl monomer as polymerization components and a (meth)acrylate-based resin containing at least two (meth)acrylates as polymerization components and have at least two glass transition temperatures. In the (meth)acrylate-based resin, the mass percentage of the (meth)acrylates with respect to the total mass of the polymerization components is 90% by mass or more. The difference between the lowest glass transition temperature among the glass transition temperatures of the "pressure phase transition layer" and the "pressure phase transition particles" and the highest glass transition temperature thereof may be 30° C. or more. The reason for this is as follows.

Generally, the compatibility between a styrene-based resin and a (meth)acrylate-based resin is low. Therefore, these resins contained in particles may be phase-separated. When the above layer and the above particles are pressurized, the following may occur. The (meth)acrylate-based resin having a relatively lower glass transition temperature is first fluidized, and then the styrene-based resin is fluidized, so that both of the resins are fluidized. The resins in the layer and the particles are fluidized under pressure and then solidify when the pressure is removed. In this case, they again form a phase separated state because of the low compatibility therebetween.

In the (meth)acrylate-based resin containing at least two (meth)acrylates as polymerization components, at least two types of ester groups are bonded to the main chain, and therefore the degree of molecular alignment in a solid state is lower than that of a homopolymer of (meth)acrylate. It is therefore inferred that the (meth)acrylate-based resin is easily fluidized under pressure. Moreover, when the mass percentage of the (meth)acrylates with respect to the total mass of the polymerization components is 90% by mass or more, at least two types of ester groups are present at a high density, and the degree of molecular alignment in the solid state is lower. In this case, it is inferred that the (meth) acrylate-based resin is more easily fluidized under pressure.

It is therefore inferred that the "pressure phase transition layer" and the "pressure phase transition particles" described above are easily fluidized when pressure is applied, i.e., easily undergo the pressure-induced phase transition.

In the (meth)acrylate-based resin which contains at least two (meth)acrylates as polymerization components and in which the mass percentage of the (meth)acrylates with respect to the total mass of the polymerization components is 90% by mass, the degree of molecular alignment is low. Therefore, when the (meth)acrylate-based resin and the styrene-based resin solidify again, they may be phase-separated finely. As the spatial scale of the phase-separated state of the styrene-based resin and the (meth)acrylate-based resin decreases, the uniformity of the state of the fixation surface of the resins fixed to an object increases, so that good pressure-bonding strength may be obtained.

This may be the reason that the pressure-bonding strength of the "pressure phase transition layer" and the "pressure phase transition particles" is high.

The steps in the printed material production method according to the present exemplary embodiment will be described together with means in the printed material production system according to the present exemplary embodiment.

<Step of Placing Pressure Phase Transition Particles and Pressure Phase Transition Particle Placing Unit>

In the placing step, a pressure phase transition particle placing unit (hereinafter referred to as a "placing unit") is used to place the pressure phase transition particles onto a recording medium having an image portion formed thereon.

No particular limitation is imposed on the means for placing the pressure phase transition particles in the placing unit, and any means that can place a target amount of the pressure phase transition particles onto a target position can be used.

Specific examples of the pressure phase transition particle placing means include: a spraying method including spraying the pressure phase transition particles; an application method including applying the pressure phase transition particles; and an electrophotographic method that uses the pressure phase transition particles as a toner.

(Position onto which Pressure Phase Transition Particles are Placed)

The pressure phase transition particles may be placed on the entire surface of the recording medium or part of the surface of the recording medium.

As for the placement position of the pressure phase transition particles on the recording medium, the pressure phase transition particles are placed on an image portion and a non-image portion on the pressure-bonding surface of the recording medium.

The pressure phase transition particles may be transparent as described later.

When the pressure phase transition particles are transparent, even when the pressure phase transition particles are placed on the image portion of the recording medium to form a pressure phase transition layer, the visibility of the image portion is maintained.

The term "transparent" means that the average light transmittance of the region on which the pressure phase transition particles are placed is 10% or more in the visible range (from 400 nm to 700 nm inclusive). The average light transmittance is preferably 50% or more, more preferably 80% or more, and still more preferably 90% or more.

The average transmittance is measured using a spectrophotometer V700 (manufactured by JASCO Corporation).

(Placement State of Pressure Phase Transition Particles)

As for the placement state of the pressure phase transition particles, the placed pressure phase transition particles may still maintain their particle shape, or the pressure phase transition particles may be aggregated to form a layer. From the viewpoint of obtaining sufficient peel strength (or pressure-bonding strength), the pressure phase transition particles may be aggregated to form a layer.

The layer formed of the pressure phase transition particles may be a continuous layer or a discontinuous layer.

From the viewpoint of obtaining sufficient pressure-bonding strength, the placement amount of the pressure phase transition particles is preferably from 0.5 $g/m^2$ to 8.0 $g/m^2$ inclusive, more preferably from 0.8 $g/m^2$ to 6.0 $g/m^2$ inclusive, and still more preferably from 1.0 $g/m^2$ to 4.5 $g/m^2$ inclusive.

However, the amount of the pressure phase transition particles placed on the image portion is set to be larger than the amount of the pressure phase transition particles placed on the non-image portion.

(Placement of Pressure Phase Transition Particles)

No particular limitation is imposed on the means for placing the pressure phase transition particles so long as the pressure phase transition particles can be placed in a target placement position, as described above. Specifically, the spraying method including spraying the pressure phase transition particles, the application method including applying the pressure phase transition particles, the electrophotographic method that uses the pressure phase transition particles as a toner, etc. may be used. The pressure phase transition particles may be directly placed onto the recording medium by dropping the pressure phase transition particles or applying the particles using a roller. No particular limitation is imposed on the method for placing the pressure phase transition particles so long as the pressure phase transition particles can be placed on the recording medium.

Examples of the placing unit that places the pressure phase transition particles onto the recording medium include a placing unit that uses the spraying method including spraying the pressure phase transition particles, a placing unit that uses the application method including applying the pressure phase transition particles, and a placing unit that uses the electrophotographic method that uses the pressure phase transition particles as a toner.

The placing step using the spraying method includes the steps of: for example, preparing a dispersion containing the pressure phase transition particles dispersed therein; spraying the dispersion onto a recording medium; and drying the dispersion sprayed onto the recording medium.

The placing unit using the spraying method includes: for example: spraying means for spraying the dispersion containing the pressure phase transition particles dispersed therein onto a recording medium; and drying means for drying the dispersion sprayed onto the recording medium.

Examples of the spraying means include a spray. Examples of the drying means include a warm air blower, a near infrared heater, and a laser application device.

The placing step using the application method includes, for example, the step of applying the pressure phase transition particles to a recording medium. In the application method, a coating solution containing the pressure phase transition particles dispersed therein may be used. The placing step using the application method using the coating solution may include the steps of, for example: preparing the coating solution containing the pressure phase transition particles dispersed therein; applying the coating solution to a recording medium; and drying the coating solution applied to the recording medium.

The placing unit using the application method includes, for example, application means for applying the pressure phase transition particles to a recording medium. The placing unit using the application method using the coating solution may include, for example: application means for applying the coating solution to a recording medium; and drying means for drying the coating solution applied to the recording medium.

Examples of the application means include rollers.

The placing step using the electrophotographic method includes the steps of, for example: a charging step of charging the surface of an image holding member; an electrostatic image forming step of forming an electrostatic image on the charged surface of the image holding member; a developing step of developing the electrostatic image formed on the surface of the image holding member with an electrostatic image developer containing the pressure phase transition particles as a pressure phase transition particle region; and a transferring step of transferring the pressure phase transition particle region formed on the surface of the image holding member to the surface of a recording medium.

The placing unit using the electrophotographic method includes, for example: an image holding member; charging means for charging the surface of the image holding member; electrostatic image forming means for forming an electrostatic image on the charged surface of the image holding member; developing means that houses an electrostatic image developer containing the pressure phase transition particles and develops the electrostatic image formed on the surface of the image holding member with the electrostatic image developer as a pressure phase transition particle region; and transferring means for transferring the pressure phase transition particle region formed on the surface of the image holding member to the surface of a recording medium.

In the placing unit using the electrophotographic method, a portion including the developing means may have a cartridge structure detachably attached to a particle placing device (the above portion unit may be a so-called process cartridge). The process cartridge used may be, for example, a process cartridge that includes the developing means that houses the electrostatic image developer containing the pressure phase transition particles and is detachably attached to the particle placing device.

The placing method and the placing unit using the electrophotographic method may be an image forming process and an image forming apparatus that use the electrophotographic method and may use well-known steps and means used for the image forming process and the image forming apparatus using the electrophotographic method.

In the placing method and the placing unit using the electrophotographic method, an intermediate transfer method may be used. In the intermediate transfer method, for example, the pressure phase transition particle region formed on the surface of the image holding member is temporarily transferred to the surface of an intermediate transfer body and then finally transferred from the surface of the intermediate transfer body to the surface of a recording medium.

The placing method and the placing unit that use the electrophotographic method may include, for example, means and steps other than those described above such as the step and means for cleaning the surface of the image holding member and a device including charge eliminating means for eliminating charges by irradiating the surface of the image holding member with charge eliminating light.

When a recording medium having an image portion formed thereon is used, the pressure phase transition particles may be placed on the recording medium having the image portion formed thereon in advance, or an image forming step of forming an image portion on the recording medium and the placing step may be performed continuously.

Example of the method for performing the image forming step and the placing step continuously include: a method including performing the image forming step using an inkjet recording method and then performing the placing step; and a method including performing both the image forming step and the placing step using the electrophotographic method. Specific examples include a method including forming a complex image portion on the surface of a recording medium using both an image forming coloring material (for example, a color ink) used in the image forming step and the pressure phase transition particles used in the placing step.

<Fixing Step and Fixing Unit>

In the fixing step, at least the pressure phase transition particles are fixed to the recording medium to form the pressure phase transition layer.

Specifically, in the fixing step, for example, the pressure phase transition particles placed on the recording medium are heated in the fixing unit.

When the image portion formed on the recording medium is an unfixed toner image portion, the fixing step may be the step of fixing the unfixed toner image portion together with the pressure phase transition particles.

No particular limitation is imposed on the means for heating the pressure phase transition particles (hereinafter referred to as "particle heating means"), and any means capable of heating the pressure phase transition particles formed and placed on the recording medium may be used.

The means for heating the pressure phase transition particles (particle heating means) may be of the contact type or may be of the non-contact-type.

Examples of the contact-type particle heating means include a method including heating a member such as a roller, a belt, or a pad and bringing the heated member into contact with the pressure phase transition particles.

Examples of the non-contact-type particle heating means include: a method including causing a recording medium having a chromatic color image formed thereon and the pressure phase transition particles placed thereon to pass through a region heated by a heater, an oven, etc.; a method including heating the pressure phase transition particles using irradiation light emitted from a halogen lamp, a xenon lamp, etc.

In particular, from the viewpoint of heating the pressure phase transition particles and preventing the pressure phase transition particles from moving, falling off, etc. the contact-type particle heating means may be used in the fixing step.

Specifically, the particle heating means may be the contact-type particle heating means.

(Heating Pressure Phase Transition Particles Using Contact-Type Means)

When the pressure phase transition particles are heated using the contact-type means, the temperature of the member to be in contact with the pressure phase transition particles (this member may be referred to also as a contact member) may be set to any temperature at which the pressure phase transition particles can be plasticized. From the viewpoint of the efficiency of heating the pressure phase transition particles, the temperature is preferably from 120° C. to 250° C. inclusive, more preferably from 130° C. to 200° C. inclusive, and still more preferably from 150° C. to 180° C. inclusive.

The set temperature of the contact member is the target temperature of the surface of the contact member to be in contact with the pressure phase transition particles.

No particular limitation is imposed on the contact member, so long as it is a member having a surface that can be heated to the above set temperature. Examples of the contact member include rollers, belts, and pads.

In the fixing step, the pressure phase transition particles may be heated and also pressurized.

By heating and pressurizing the pressure phase transition particles simultaneously, smoothness can be imparted to the surface on which the pressure phase transition particles are placed (for example, the surface of the pressure phase transition layer).

The pressure applied to the pressure phase transition particles in the fixing step may be, for example, a pressure applied by fixing means that uses the electrophotographic method.

Examples of the means for heating and pressurizing the pressure phase transition particles simultaneously (this means may be referred to also as a heating-pressurizing member) include:

- a pair of heating-pressurizing rollers in contact with each other, the heating-pressurizing rollers being configured such that heat is applied from at least one of the rollers and that the heat and pressure are applied to a recording medium having a chromatic color image formed thereon and the pressure phase transition particles placed on the recording medium by causing the recording medium to pass between the rollers;
- a heating-pressurizing member including a roller and a belt in contact with each other, the heating-pressurizing member being configured such that heat is applied from at least one of the roller and the belt and that the heat and pressure are applied to a recording medium having a chromatic color image formed thereon and the pressure phase transition particles placed on the recording medium by causing the recording medium to pass between the roller and the belt; and
- a pair of heating-pressurizing belts in contact with each other, the heating-pressurizing belts being configured such that heat is applied from at least one of the belts and that the heat and pressure are applied to a recording medium having a chromatic color image formed thereon and the pressure phase transition particles placed on the recording medium by causing the recording medium to pass between the belts.

<Press-Bonding Step and Pressure-Bonding Unit>

In the pressure-bonding step, the recording medium is folded upon itself and subjected to pressure-bonding such that the surface on which the image portion and the pressure phase transition layer are formed serves as the pressure-bonding surface, or the recording medium and an additional recording medium are stacked together and pressure-bonded such that the surface on which the image portion and the pressure phase transition layer are formed serves as the pressure-bonding surface. The recording medium with the image portion and the pressure phase transition layer formed thereon may be referred to also as a "post-placement recording medium."

Specifically, in the pressure-bonding step, a multilayer body obtained by folding the recording medium having the image portion and the pressure phase transition layer formed thereon (i.e., the post-placement recording medium) upon itself with the pressure phase transition layer interposed between panels of the folded recording medium is pressurized in the thickness direction of the multilayer body, or a multilayer body obtained by stacking the post-placement recording medium having the image portion and the pressure phase transition layer formed thereon and an additional recording medium together such that the pressure phase transition layer is interposed therebetween is pressurized in the thickness direction of the multilayer body.

Examples of the mode of folding of the post-placement recording medium include a half fold, a trifold, and a quarter fold, and the recording medium may overlap itself only partially. In this case, the pressure phase transition layer fixed in the fixing step is disposed on two opposing faces of the post-placement recording medium.

Examples of the mode of stacking of the post-placement recording medium and the additional recording medium include: a mode in which one additional recording medium is stacked on the post-placement recording medium; and a mode in which a plurality of additional recording mediums are stacked on respective regions of the post-placement recording medium. Each additional recording medium may be a recording medium having an image formed in advance on one side or both sides, may be a recording medium having no image portion formed thereon, or may be a pressure-bonded printed material produced in advance. In this case, the pressure phase transition particles fixed in the fixing step are disposed on opposed two surfaces of the post-placement recording medium and the additional recording medium.

No particular limitation is imposed on the means for pressurizing the multilayer body (multilayer body pressurizing means) so long as it can pressurize the multilayer body in its thickness direction. The multilayer body pressurizing means may be means for causing the multilayer body to pass between a pair of separated rollers or may be means for pressing the multilayer body using a press.

In particular, the pressure-bonding step may be the step of pressurizing the multilayer body in its thickness direction by causing it to pass between a pair of rollers spaced by a distance C from each other.

Specifically, the multilayer body pressurizing means may be means for pressurizing the multilayer body in its thickness direction by causing it to pass between a pair of rollers spaced by a distance C from each other.

From the viewpoint of obtaining target peel strength (or pressure-bonding strength), the distance C may be appropriately determined according to the thickness of the multilayer body to be pressurized and is, for example, preferably from 0.01 mm to 0.40 mm inclusive, more preferably from 0.05 mm to 0.30 mm inclusive, and still more preferably from 0.10 mm to 0.25 mm inclusive.

(Pressurizing Conditions)

The maximum pressure applied in the thickness direction of the multilayer body (hereinafter referred to also as "pressure-bonding pressure") is preferably from 48 MPa to 120 MPa inclusive, more preferably from 60 MPa to 110 MPa inclusive, and still more preferably from 80 MPa to 100 MPa inclusive.

When the pressure-bonding pressure is 48 MPa or higher, sufficient pressure-bonding strength is easily obtained. When the pressure-bonding pressure is 120 MPa or less, breakage, deformation, etc. of the recording medium during pressurization can be easily prevented.

The pressure-bonding pressure is measured using a commercial pressure measurement film. Specific examples of the pressure measurement film include a pressure measurement film Prescale manufactured by FUJIFILM Corporation. The above maximum pressure is the maximum value when varying pressure is applied to the multilayer body using the multilayer body pressurizing means.

The multilayer body pressurizing means used may be a commercial device. Specific examples include: PRESSLE LEADA, PRESSLE CORE, and PRESSLE Bee manufactured by TOPPAN FORMS CO., LTD.; and S-500H, PS-500, EX-4100WI, EX-4100W, EX-4100/4150, and PS-100 manufactured by DUPLO SEIKO CORPORATION.

The pressure-bonding step may be performed without heating or may be performed under heating.

Specifically, the multilayer body pressurizing means may not include heating means and may pressurize the multilayer body without heating or may include the heating means and may pressurize the multilayer body under heating.

The printed material production method according to the present exemplary embodiment may include an additional step other than the placing step, the fixing step, and the pressure-bonding step.

Examples of the additional step include: the step of, before the placement of the pressure phase transition particles, forming the image portion on the recording medium; and the step of cutting the post-placement recording medium subjected to the fixing step or the multilayer body subjected to the pressure-bonding step into a target size.

<Examples of Production System and Production Method>

An example of the printed material production system according to the present exemplary embodiment will next be shown, and the printed material production method according to the present exemplary embodiment will be described. However the present exemplary embodiment is not a limitation.

Figure 2:
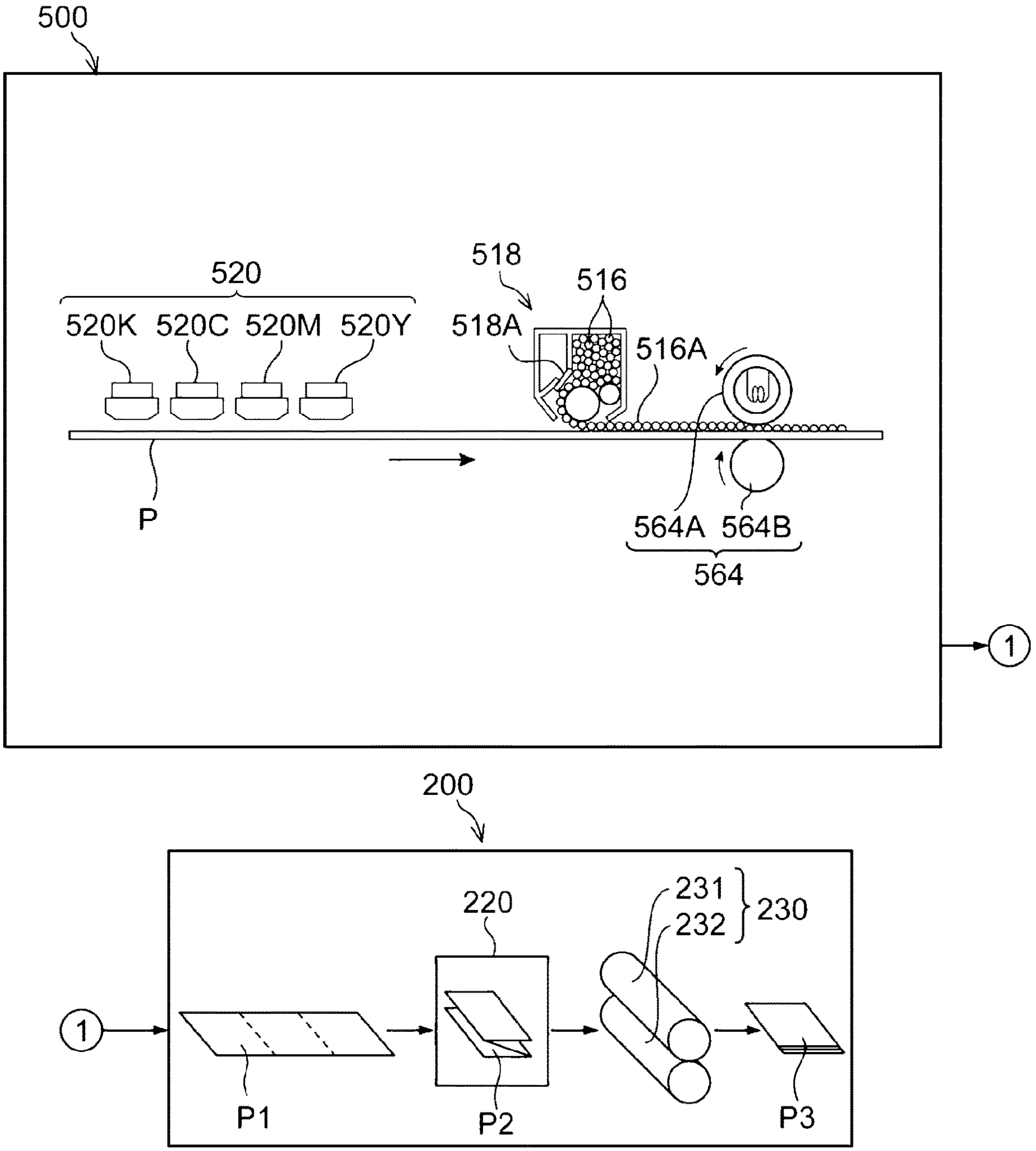
FIG. 2 is a schematic illustration showing an example of a printed material production system according to an exemplary embodiment.

FIG. 2 is a schematic illustration showing an example of the printed material production system according to the present exemplary embodiment. The printed material production system shown in FIG. 2 includes: printing means 500 for forming an image portion on a recording medium using an inkjet method and then placing the pressure phase transition particles; and pressure-bonding means 200 disposed downstream of the printing means 500. Arrows indicate the conveying direction of the recording medium.

The printing means 500 includes, as examples of an image forming unit, inkjet recording heads 520 that form an image portion by ejecting ink droplets onto the recording medium P.

A particle placing device 518 that places pressure phase transition particles 516 on the surface of the recording medium P is disposed downstream of the inkjet recording heads 520 in the conveying direction of the recording medium P (the direction indicated by an arrow in the figure). The particle placing device 518 is an example of the placing unit that places the pressure phase transition particles on the recording medium using the application method.

The printing means 500 further includes: a recording medium container (not shown) that contains recording mediums P; a conveying unit (not shown) that conveys a recording medium P contained in the recording medium container; a fixing device 564 that fixes the ink droplets and the pressure phase transition particles 516 placed on the recording medium P to the recording medium P; and a recording medium discharge unit (not shown) that discharges the recording medium P to which the ink droplets and the pressure phase transition particles 516 have been fixed in the fixing device 564.

The fixing device 564 includes: a heating roller 564A including a heat source disposed thereinside; and a pressurizing roller 564B disposed so as to be opposed to the heating roller 564A.

The particle placing device 518 supplies the pressure phase transition particles 516 to the surface of the recording medium P and forms a pressure phase transition particle region 516A on the surface of the recording medium P.

The particle placing device 518 includes a supply roller 518A in a portion facing the recording medium P and places the pressure phase transition particles 516 on the ink-applied region.

In the particle placing device 518, the pressure phase transition particles 516 are supplied to the supply roller 518A (conductive roller), and the amount of the pressure phase transition particles 516 to be placed on the recording medium P (i.e., the layer thickness of the pressure phase transition particle region 516A placed on the recording medium P so as to form a layer) is controlled.

The inkjet recording heads 520 include an inkjet recording head 520Y including a nozzle that ejects yellow ink droplets, an inkjet recording head 520M including a nozzle that ejects magenta ink droplets, an inkjet recording head 520C including a nozzle that ejects cyan ink droplets, and an inkjet recording head 520K including a nozzle that ejects black ink droplets. These inkjet recording heads 520 are driven by a piezoelectric method, a thermal method, etc.

Each of the inkjet recording heads 520 may be a recording head that has a recording width equal to or larger than the width of a recording region, does not move in a direction crossing the conveying direction of the recording medium P, and ejects liquid droplets onto the recording medium P to record an image or may be a recording head that moves in a direction crossing the conveying direction of the recording medium P and ejects liquid droplets onto the recording medium P to record an image.

The ink ejected from each inkjet recording head 520 may be a water-based ink or an oil-based ink. In terms of environmental friendliness, the ink used may be a water-based ink. Each water-based ink contains a recording material such as a coloring material and an ink solvent (such as water or a water-soluble organic solvent). Moreover, an additional additive may be optionally contained.

In the printing means 500, the conveying unit first conveys a recording medium P from the recording medium container. When the recording medium P reaches the inkjet recording heads 520, the inkjet recording heads 520 place respective color ink droplets onto the recording medium P, and an image portion is thereby formed. Next, when the recording medium P having the image portion formed thereon and conveyed by the conveying unit reaches the particle placing device 518, the particle placing device 518 places the pressure phase transition particles 516 onto the recording medium P, and a pressure phase transition particle region 516A is thereby formed.

The recording medium P with the image portion and the pressure phase transition particle region 516A formed thereon is then conveyed to the fixing device 564 (an example of the fixing unit). The pressure applied to the recording medium P from the fixing device 564 may be lower than the pressure to be applied to the recording medium P from a pressurizing device 230 and specifically may be from 0.2 MPa to 1 MPa inclusive. The temperature of the surface of the recording medium P heated by the heating roller 564A of the fixing device 564 is preferably from 150° C. to 220° C. inclusive, more preferably from 155° C. to 210° C. inclusive, and still more preferably from 160° C. to 200° C. inclusive.

As described above, when the recording medium P passes through the printing means 500, a post-placement recording medium P1 having the image portion formed thereon and having the pressure phase transition particles placed thereon is obtained.

Then the post-placement recording medium P1 is conveyed to the pressure-bonding means 200.

In the printed material production system according to the present exemplary embodiment, the printing means 500 and the pressure-bonding means 200 may be close to each other or spaced apart from each other.

When the printing means 500 and the pressure-bonding means 200 are spaced apart from each other, the printing means 500 and the pressure-bonding means 200 are connected, for example, by conveying means (e.g., a belt conveyer) for conveying the post-placement recording medium P1.

The pressure-bonding means 200 includes a folding device 220 and the pressurizing device 230 and is means for folding the post-placement recording medium P1 and pressure-bonding the folded post-placement recording medium P1.

The folding device 220 folds the post-placement recording medium P1 passing therethrough to produce a folded recording medium, i.e., a multilayer body P2.

In the folded recording medium (i.e., the multilayer body), the pressure phase transition particles placed by the printing means 500 are disposed on at least part of at least one of the two opposed surfaces of the recording medium.

The pressure-bonding means 200 may include a stacking device that stacks the post-placement recording medium and an additional recording medium together instead of the folding device 220.

In the recording medium obtained using the stacking device, i.e., the multilayer body, the pressure phase transition particles placed by the printing means 500 are disposed on at least part of at least one of the two opposed surfaces of the post-placement recording medium and the additional recording medium.

The multilayer body P2 outputted from the folding device 220 (or the stacking device) is conveyed to the pressurizing device 230.

The pressurizing device 230 includes, for example, a pair of pressurizing members (i.e., pressurizing rollers 231 and 232). The pressurizing roller 231 and the pressurizing roller 232 are spaced by a distance C. When the multilayer body P2 passes between the rollers, pressure is applied to the multilayer body P2 in its thickness direction. The pair of pressurizing members included in the pressurizing device 230 is not limited to the combination of the pressurizing rollers and may be a combination of a pressurizing roller and a pressurizing belt or a combination of pressurizing belts.

The pressurizing device 230 may or may not include thereinside a heat source (e.g., a halogen heater) for heating the multilayer body P2. When the pressurizing device 230 includes the heat source thereinside, the temperature of the surface of the multilayer body P2 heated by the heat source is preferably from 30° C. to 120° C. inclusive, more preferably from 40° C. to 100° C. inclusive, and still more preferably from 50° C. to 90° C. inclusive. The pressurizing device 230 may not include the heat source thereinside, and this does not exclude that the temperature inside the pressurizing device 230 increases to a temperature equal to or higher than the temperature of the environment due to heat from, for example, a motor included in the pressurizing device 230.

When pressure is applied to the multilayer body P2 passing through the pressurizing device 230, the contacting surfaces of the multilayer body P2 are fixed by the fluidized pressure phase transition particles, and a pressure-bonded printed material P3 is thereby produced.

In the pressure-bonded printed material P3 produced, the opposed surfaces are partly or entirely fixed to each other.

The completed pressure-bonded printed material P3 is discharged from the pressurizing device 230.

A first form of the pressure-bonded printed material P3 is a pressure-bonded printed material in which the opposed surfaces of the panels of the folded recording medium are fixed through the pressure phase transition particles.

The pressure-bonded printed material P3 is produced using the printed material production system including the folding device 220.

A second form of the pressure-bonded printed material P3 is a pressure-bonded printed material in which opposed surfaces of a plurality of stacked recording mediums are fixed through the pressure-bonded printed material.

This pressure-bonded printed material P3 is produced using a pressure-bonded printed material production system including the stacking device.

The printed material production system according to the present exemplary embodiment is not limited to a device of the type in which the multilayer body P2 is continuously conveyed from the folding device 220 (or the stacking device) to the pressurizing device 230.

The printed material production system according to the present exemplary embodiment may be a device of the type in which multilayer bodies P2 discharged from the folding device 220 (or the stacking device) are accumulated and then conveyed to the pressurizing device 230 when the number of accumulated multilayer bodies P2 reaches a predetermined number.

In the printed material production system according to the present exemplary embodiment, the folding device 220 (or the stacking device) and the pressurizing device 230 may be close to each other or may be spaced apart from each other. When the folding device 220 (or the stacking device) is spaced apart from the pressurizing device 230, the folding device 220 (or stacking device) may be connected to the pressurizing device 230 through, for example, conveying means (e.g., a belt conveyer) for conveying multilayer bodies P2.

The printed material production system according to the present exemplary embodiment may further include cutting means for cutting a recording medium into a predetermined size. Examples of the cutting means include: cutting means that is disposed between the printing means 500 and the pressure-bonding means 200 and cuts off a portion of the post-placement recording medium P1 on which no pressure phase transition particles are disposed; cutting means that is disposed between the folding device 220 and the pressurizing device 230 and cuts off a portion of the multilayer body P2 on which no pressure phase transition particles are disposed; and cutting means that is disposed downstream of the pressure-bonding means 200 and cuts off a portion of the pressure-bonded printed material P3 that is not fixed by the pressure phase transition particles.

The cutting means may be used to cut off part of a region on which the pressure phase transition particles are disposed.

The printed material production system according to the present exemplary embodiment is not limited to a sheet fed-type device. The printed material production system according to the present exemplary embodiment may be a device of the type in which a long recording medium is subjected to the placement step and the pressure-bonding step to form a long pressure-bonded printed material and then the long pressure-bonded printed material is cut into a predetermined size.

Figure 3:
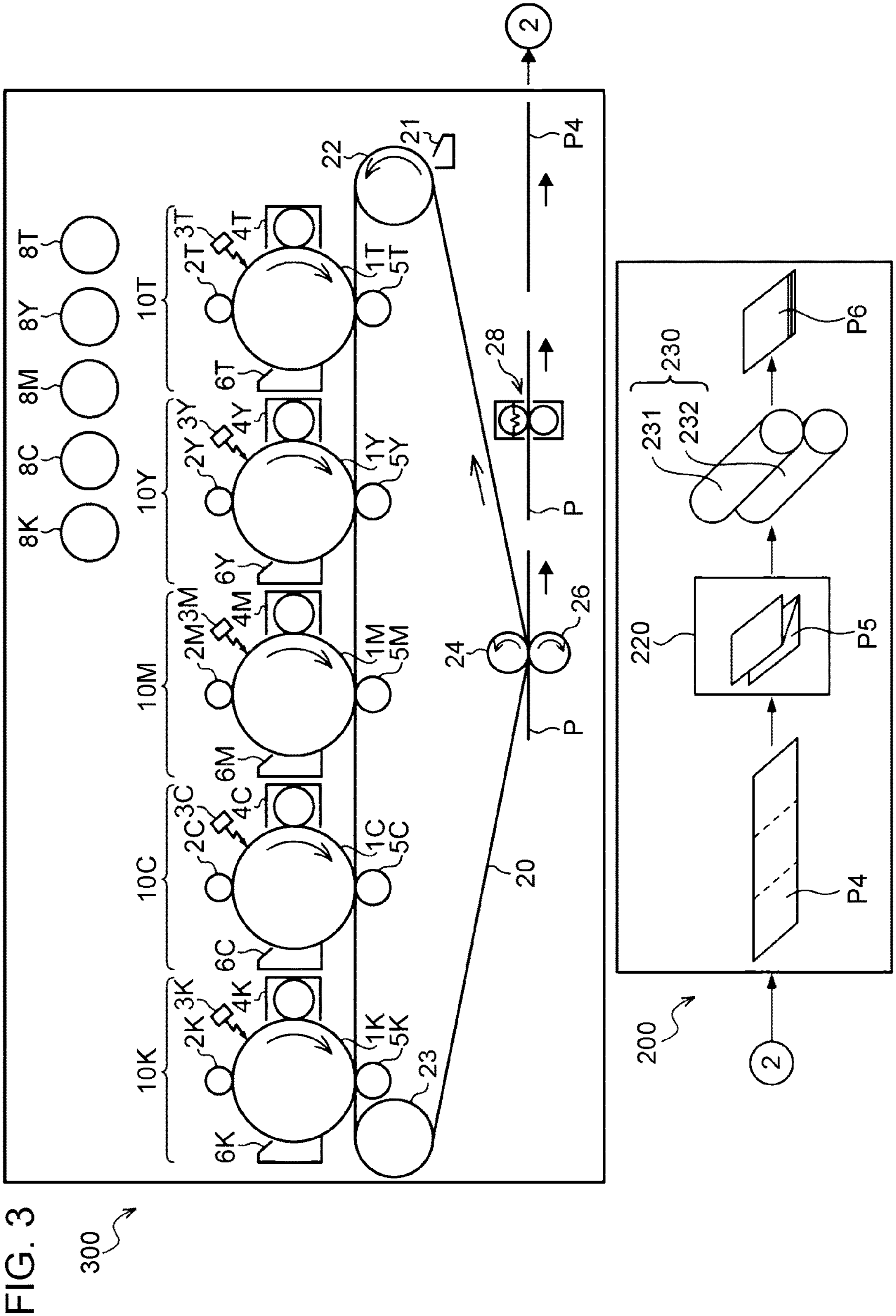
FIG. 3 is a schematic illustration showing another example of the printed material production system according to the present exemplary embodiment.

FIG. 3 is a schematic configuration diagram showing an example of the printed material production system according to the present exemplary embodiment. The printed material production system shown in FIG. 3 includes: printing means 300 for forming an image portion on a recording medium and then placing the pressure phase transition particles onto the recording medium; and pressure-bonding means 200 disposed downstream of the printing means 300.

The printing means 300 is quintuple tandem printing means of the intermediate transfer type.

The printing means 300 includes: a unit 10T that places the pressure phase transition particles (T); and units 10Y, 10M, 10C, and 10K that form yellow (Y), magenta (M), cyan (C), and black images, respectively.

The unit 10T is the particle placing means (i.e., the placing unit) for placing the pressure phase transition particles on the recording medium P using a developer containing the pressure phase transition particles.

The units 10Y, 10M, 10C, and 10K are each means for forming a color image (i.e., an image portion) on the recording medium P using a developer containing a color toner.

The units 10T, 10Y, 10M, 10C, and 10K each use the electrophotographic method.

The units 10T, 10Y, 10M, 10C, and 10K are arranged so as to be horizontally spaced apart from each other. The units 10T, 10Y, 10M, 10C, and 10K each may be a process cartridge detachably attached to the printing means 300.

An intermediate transfer belt (an example of the intermediate transfer body) is disposed so as to extend through lower portions of the units 10T, 10Y, 10M, 10C, and 10K. The intermediate transfer belt 20 is wound around a driving roller 22, a support roller 23, and a facing roller 24 that are in contact with the inner surface of the intermediate transfer belt 20 and runs in a direction from the unit 10T toward the unit 10K. An intermediate transfer body cleaning device 21 is disposed on the image holding surface side of the intermediate transfer belt 20 so as to be opposed to the driving roller 22.

The units 10T, 10Y, 10M, 10C, and 10K include respective developing devices (examples of the developing means) 4T, 4Y, 4M, 4C, and 4K. The pressure phase transition particles, a yellow toner, a magenta toner, a cyan toner, and a black toner housed in respective cartridges 8T, 8Y, 8M, 8C, and 8K are supplied to the respective developing devices 4T, 4Y, 4M, 4C, and 4K.

Since the units 10T, 10Y, 10M, 10C, and 10K have the same structure and operate similarly, the unit 10T that places the pressure phase transition particles on a recording medium will be described as a representative unit.

The unit 10T includes a photoconductor (an example of the image holding member) 1T. A charging roller (an example of the charging means) 2T, an exposure device (an example of the electrostatic image forming means) 3T, a developing device (an example of the developing means) 4T, a first transfer roller (an example of first transferring means) 5T, and a photoconductor cleaner (an example of cleaning means) 6T are disposed around the photoconductor 1T in this order. The charging roller charges the surface of the photoconductor 1T, and the exposure device 3T exposes the charged surface of the photoconductor 1T to a laser beam to form an electrostatic image. The developing device 4T supplies the pressure phase transition particles to the electrostatic image to develop the electrostatic image to thereby form a pressure phase transition particle region, and the first transfer roller 5T transfers the pressure phase transition particle region formed by development onto the intermediate transfer belt 20. The photoconductor cleaner 6T removes the pressure phase transition particles remaining on the surface of the photoconductor 1T after the first transfer. The first transfer roller 5T is disposed on the inner side of the intermediate transfer belt 20 and placed at a position opposed to the photoconductor 1T.

The operation of the unit 10T will be described as an example to thereby explain operations including the placement of the pressure phase transition particles on the recording medium P and the formation of an image portion on the recording medium P.

First, the charging roller 2T charges the surface of the photoconductor 1T. The exposure device 3T irradiates the charged surface of the photoconductor 1T with a laser beam according to image data sent from an unillustrated controller. An electrostatic image that is a region to which the pressure phase transition particles are to be placed is thereby formed on the surface of the photoconductor 1T.

The electrostatic image formed on the photoconductor 1T rotates to a developing position as the photoconductor 1T rotates. The electrostatic image on the photoconductor 1T is developed at the developing position using the developing device 4T, and a pressure phase transition particle region is thereby formed.

The developer containing at least the pressure phase transition particles and a carrier is housed in the developing device 4T. The pressure phase transition particles together with the carrier are agitated in the developing device 4T, thereby frictionally charged, and held on a developer roller. As the surface of the photoconductor 1T passes through the developing device 4T, the pressure phase transition particles electrostatically adhere to the electrostatic image on the surface of the photoconductor 1T. The electrostatic image is developed with the pressure phase transition particles, and the pressure phase transition particle region is thereby formed. Then the photoconductor 1T with the pressure phase transition particle region formed thereon continues running, and the pressure phase transition particle region formed on the photoconductor 1T is conveyed to a first transfer position.

When the pressure phase transition particle region on the photoconductor 1T is conveyed to the first transfer position, a first transfer bias is applied to the first transfer roller 5T, and an electrostatic force directed from the photoconductor 1T toward the first transfer roller 5T acts on the pressure phase transition particle region, so that the pressure phase transition particle region on the photoconductor 1T is transferred onto the intermediate transfer belt 20. The pressure phase transition particles remaining on the photoconductor 1T are removed by the photoconductor cleaner 6T and collected. The photoconductor cleaner 6T is, for example, a cleaning blade or a cleaning brush and is preferably a cleaning brush.

Similar operations to those in the unit 10T are performed also in each of the unit 10Y, 10M, 10C, and 10K using a developer containing a color toner. The intermediate transfer belt 20 with the pressure phase transition particle region transferred thereto in the unit 10T is sequentially transported through the units 10Y, 10M, 10C, and 10K, and toner images of respective colors are multi-transferred onto the intermediate transfer belt 20.

Then the intermediate transfer belt 20 with the pressure phase transition particle region and the four toner images multi-transferred thereon in the units 10T, 10Y, 10M, 10C, and 10K reaches a second transfer unit that is composed of the intermediate transfer belt 20, the facing roller 24 in contact with the inner surface of the intermediate transfer belt, and a second transfer roller (an example of second transferring means) 26 disposed on the image holding surface side of the intermediate transfer belt 20. A recording medium P is supplied to the gap between the second transfer roller 26 and the intermediate transfer belt 20 in contact with each other through a supply mechanism, and a second transfer bias is applied to the facing roller 24. In this case, an electrostatic force directed from the intermediate transfer belt 20 to the recording medium P acts on the pressure phase transition particle region and the toner images, and the pressure phase transition particle region and the toner images on the intermediate transfer belt 20 are thereby transferred onto the recording medium P.

The recording medium P with the pressure phase transition particle region and the toner images transferred thereon is conveyed to a heating device (an example of the particle heating means) 28, which is an example of the fixing unit. Heating by the heating device 28 causes the toner images to be thermally fixed onto the recording medium P. The pressure phase transition particle region is also heated, and the plasticization of the pressure phase transition particles is facilitated.

From the viewpoint of preventing the pressure phase transition particles from falling off the recording medium P, from the viewpoint of improving the fixability of the color toners onto the recording medium P, and from the viewpoint of facilitating the plasticization of the pressure phase transition particles, the heating device 28 may be a device that performs heating and pressurization (which is referred to also as a heating-pressurizing device).

When the heating device 28 is the heating-pressurizing device, the heating-pressurizing device may include a heat source such as a halogen heater and a pair of rollers that come into contact with the pressure phase transition particle region and the toner images on the recording medium P to heat the pressure phase transition particle region and the toner images. When the recording medium with the pressure phase transition particle region and the toner images formed thereon passes between the pair of rollers, the toner images are thermally fixed onto the recording medium P. Moreover, the pressure phase transition particle region is heated, and the plasticization of the pressure phase transition particles is facilitated.

As described above, the recording medium P passing through the printing means 300 becomes a post-placement recording medium P4 having the image portion formed thereon and the pressure phase transition particles placed thereon.

Then the post-placement recording medium P4 is conveyed to the pressure-bonding means 200.

In the printed material production system according to the present exemplary embodiment, the printing means 300 and the pressure-bonding means 200 may be close to each other or spaced apart from each other.

When the printing means 300 and the pressure-bonding means 200 are spaced from each other, the printing means 300 may be connected to the pressure-bonding means 200 using, for example, conveying means (for example, a belt conveyer) for conveying the post-placement recording medium P4.

The pressure-bonding means 200 shown in FIG. 3 includes a folding device 220 and a pressurizing device 230 as in the pressure-bonding means 200 shown in FIG. 2 and pressure-bonds a multilayer body P5 obtained by folding the post-placement recording medium P4 to thereby obtain a pressure-bonded printed material P6.

The pressure-bonding means 200 used in the printed material production system shown in FIG. 3 is the same as the pressure-bonding means 200 in the printed material production system shown in FIG. 2.

<Pressure-Phase Transition Layer and Pressure Phase Transition Particles>

The details of the pressure phase transition layer and the pressure phase transition particles in the present exemplary embodiment will be described.

Since the pressure phase transition layer in the present exemplary embodiment is formed of the pressure phase transition particles in the present exemplary embodiment, only the pressure phase transition particles in the present exemplary embodiment will be described.

The pressure phase transition particles in the present exemplary embodiment include at least base particles and contain an optional external additive.

The base particles included in the pressure phase transition particles may have at least two glass transition temperatures, and the difference between the lowest glass transition temperature and the highest glass transition temperature may be 30° C. or more.

[Base Particles]

(Binder Resins)

The base particles contain, as binder resins, a styrene-based resin containing styrene and an additional vinyl monomer as polymerization components and a (meth)acrylate-based resin which contains at least two (meth)acrylates as polymerization components and in which the mass percentage of the (meth)acrylates with respect to the total mass of the polymerization components is 90% by mass or more.

The "styrene-based resin containing styrene and an additional vinyl monomer as polymerization components" is referred to also as a "specific styrene-based resin," and the "(meth)acrylate-based resin which contains at least two (meth)acrylates as polymerization components and in which the mass percentage of the (meth)acrylates with respect to the total mass of the polymerization components is 90% by mass or more" is referred to also as a "specific (meth) acrylate-based resin."

From the viewpoint of maintaining pressure-bonding strength, the content of the specific styrene-based resin in the base particles may be larger than the content of the specific (meth)acrylate-based resin. The content of the specific styrene-based resin with respect to the total mass of the specific styrene-based resin and the specific (meth)acrylate-based resin is preferably from 55% by mass to 80% by mass inclusive, more preferably from 60% by mass to 75% by mass inclusive, and still more preferably from 65% by mass to 70% by mass inclusive.

—Specific Styrene-Based Resin—

The base particles included in the pressure phase transition particles contain the specific styrene-based resin including styrene and an additional vinyl monomer as polymerization components.

From the viewpoint of preventing the pressure phase transition particles with no pressure applied thereto from fluidizing, the mass percentage of styrene with respect to the total mass of the polymerization components of the specific styrene-based resin is preferably 60% by mass or more, more preferably 70% by mass or more, and still more preferably 75% by mass or more.

From the viewpoint of allowing the pressure phase transition particles formed to easily undergo the pressure-induced phase transition, the mass percentage of styrene with respect to the total mass of the polymerization components of the specific styrene-based resin is preferably 95% by mass or less, more preferably 90% by mass or less, and still more preferably 85% by mass or less.

Specifically, the mass percentage of styrene with respect to the total mass of the polymerization components of the specific styrene-based resin is preferably from 60% by mass to 95% by mass inclusive.

Examples of the additional vinyl monomer other than styrene included in the polymerization components of the specific styrene-based resin (this vinyl monomer may be referred to simple as an additional vinyl monomer) include styrene-based monomers and acrylic-based monomers.

Examples of the styrene-based monomers used as the additional vinyl monomer include: vinylnaphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene.

Any one of these styrene-based monomers may be used alone, or two or more of them may be used in combination.

The acrylic-based monomer used as the additional vinyl monomer may be at least one acrylic-based monomer selected from the group consisting of (meth)acrylic acid and (meth)acrylates. Examples of the (meth)acrylate include alkyl (meth)acrylates, carboxy-substituted alkyl (meth)acrylates, hydroxy-substituted alkyl (meth)acrylates, alkoxy-substituted alkyl (meth)acrylates, and di(meth)acrylates.

Any one of these acrylic-based monomers may be used alone, or two or more of them may be used in combination.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)methacrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth) acrylate, and isobornyl (meth)acrylate.

Examples of the carboxy-substituted alkyl (meth)acrylates include 2-carboxyethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of the alkoxy-substituted alkyl (meth)acrylates include 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Other examples of the (meth)acrylate include 2-(diethylamino)ethyl (meth)acrylate, benzyl (meth)acrylate, and methoxypolyethylene glycol (meth)acrylate.

Other examples of the additional vinyl monomer included in the polymerization components of the specific styrene-based resin include, in addition to the styrene-based monomers and the acrylic-based monomers: (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene.

From the viewpoint of allowing the pressure phase transition particles formed to easily undergo the pressure-induced phase transition, the additional vinyl monomer contained in the specific styrene-based resin as a polymerization component includes preferably a (meth)acrylate, more preferably an alkyl (meth)acrylate, still more preferably an alkyl (meth)acrylate having an alkyl group having 2 to 10 carbon atoms, and yet more preferably an alkyl (meth)acrylate having an alkyl group having 4 to 8 carbon atoms.

From the viewpoint of allowing the pressure phase transition particles formed to easily undergo the pressure-induced phase transition, the additional vinyl monomer contained in the specific styrene-based resin as a polymerization component includes particularly preferably at least one of n-butyl acrylate and 2-ethylhexyl acrylate.

From the viewpoint of allowing the pressure phase transition particles formed to easily undergo the pressure-induced phase transition, the specific styrene-based resin and the specific (meth)acrylate-based resin described later may include the same (meth)acrylate as a polymerization component.

From the viewpoint of preventing the pressure phase transition particles with no pressure applied thereto from fluidizing, the mass percentage of the (meth)acrylate with respect to the total mass of the polymerization components of the specific styrene-based resin is preferably 40% by mass or less, more preferably 30% by mass or less, and still more preferably 25% by mass or less. From the viewpoint of allowing the pressure phase transition particles formed to easily undergo the pressure-induced phase transition, the mass percentage of the (meth)acrylate is preferably 5% by mass or more, more preferably 10% by mass or more, and still more preferably 15% by mass or more. The (meth) acrylate is preferably an alkyl (meth)acrylate, more preferably an alkyl (meth)acrylate having an alkyl group having 2 to 10 carbon atoms, and still more preferably an alkyl (meth)acrylate having an alkyl group having 4 to 8 carbon atoms.

Particularly preferably, the specific styrene-based resin includes at least one of n-butyl acrylate and 2-ethylhexyl acrylate as a polymerization component. From the viewpoint of preventing the pressure phase transition particles with no pressure applied thereto from fluidizing, the total amount of n-butyl acrylate and 2-ethylhexyl acrylate with respect to the total mass of the polymerization components of the styrene-based resin is preferably 40% by mass or less, more preferably 30% by mass or less, and still more preferably 25% by mass or less. From the viewpoint of allowing the pressure phase transition particles formed to easily undergo the pressure-induced phase transition, the total amount of n-butyl acrylate and 2-ethylhexyl acrylate is preferably 5% by mass or more, more preferably 10% by mass or more, and still more preferably 15% by mass or more.

From the viewpoint of preventing the pressure phase transition particles with no pressure applied thereto from fluidizing, the weight average molecular weight of the specific styrene-based resin is preferably 3000 or more, more preferably 4000 or more, and still more preferably 5000 or more. From the viewpoint of allowing the pressure phase transition particles formed to easily undergo the pressure-induced phase transition, the weight average molecular weight of the specific styrene-based resin is preferably 60000 or less, more preferably 55000 or less, and still more preferably 50000 or less.

The weight average molecular weight of the resin is measured by gel permeation chromatography (GPC). In the molecular weight measurement by GPC, a GPC apparatus HLC-8120GPC manufactured by TOSOH Corporation is used. A TSKgel Super HM-M (15 cm) column manufactured by TOSOH Corporation and a tetrahydrofuran solvent are used. The weight average molecular weight of the resin is computed using a molecular weight calibration curve produced using monodispersed polystyrene standard samples.

From the viewpoint of preventing the pressure phase transition particles with no pressure applied thereto from fluidizing, the glass transition temperature of the specific styrene-based resin is preferably 30° C. or higher, more preferably 40° C. or higher, and still more preferably 50° C. or higher. From the viewpoint of allowing the pressure phase transition particles formed to easily undergo the pressure-induced phase transition, the glass transition temperature of the specific styrene-based resin is preferably 110° C. or lower, more preferably 100° C. or lower, and still more preferably 90° C. or lower.

The glass transition temperature of the resin is determined using a differential scanning calorimetry curve (DSC curve) obtained by differential scanning calorimetry (DSC). More specifically, the glass transition temperature of the resin is determined from "extrapolated glass transition onset temperature" described in glass transition temperature determination methods in "Testing methods for transition temperatures of plastics" in JIS K7121-1987.

The glass transition temperature of the resin is controlled by adjusting the types of polymerization components and their polymerization ratio. The higher the density of flexible units such as methylene groups, ethylene groups, and oxyethylene groups included in the main chain, the lower the glass transition temperature tends to be. The higher the density of rigid units such as aromatic rings and cyclohexane rings included in the main chain, the higher the glass transition temperature tends to be. The higher the density of aliphatic groups in a side chain, the lower the glass transition temperature tends to be.

From the viewpoint of preventing the pressure phase transition particles with no pressure applied thereto from fluidizing, the mass percentage of the specific styrene-based resin with respect to the total mass of the base particles is preferably 55% by mass or more, more preferably 60% by mass or more, and still more preferably 65% by mass or more. From the viewpoint of allowing the pressure phase transition particles formed to easily undergo the pressure-induced phase transition, the mass percentage of the specific styrene-based resin is preferably 80% by mass or less, more preferably 75% by mass or less, and still more preferably 70% by mass or less.

—Specific (Meth)Acrylate-Based Resin—

The base particles included in the pressure phase transition particles may contain the (meth)acrylate-based resin which contains at least two (meth)acrylates as polymerization components and in which the mass percentage of the (meth)acrylates with respect to the total mass of the polymerization components is 90% by mass or more.

The mass percentage of the (meth)acrylates with respect to the total mass of the polymerization components of the (meth)acrylate-based resin is 90% by mass or more, more preferably 95% by mass or more, still more preferably 98% by mass or more, and yet more preferably 100% by mass.

Examples of the (meth)acrylates include alkyl (meth) acrylates, carboxy-substituted alkyl (meth)acrylates, hydroxy-substituted alkyl (meth)acrylates, alkoxy-substituted alkyl (meth)acrylates, and di(meth)acrylates.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)methacrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth) acrylate, and isobornyl (meth)acrylate.

Examples of the carboxy-substituted alkyl (meth)acrylates include 2-carboxyethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of the alkoxy-substituted alkyl (meth)acrylates include 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Other examples of the (meth)acrylates include 2-(diethylamino)ethyl (meth)acrylate, benzyl (meth)acrylate, and methoxypolyethylene glycol(meth)acrylate.

Any one of these (meth)acrylates may be used alone, or two or more of them may be used in combination.

From the viewpoint of allowing the pressure phase transition particles formed to easily undergo the pressure-induced phase transition and to exhibit good pressure-bonding strength, each of the (meth)acrylates is preferably an alkyl (meth)acrylate, more preferably an alkyl (meth)acrylate having an alkyl group having 2 to 10 carbon atoms, still more preferably an alkyl (meth)acrylate having an alkyl group having 4 to 8 carbon atoms, and particularly preferably n-butyl acrylate or 2-ethylhexyl acrylate.

As described above, from the viewpoint of allowing the pressure phase transition particles formed to easily undergo the pressure-induced phase transition, the specific (meth) acrylate-based resin and the specific styrene-based resin may include the same (meth)acrylate as a polymerization component.

From the viewpoint of allowing the pressure phase transition particles formed to easily undergo the pressure-induced phase transition and to exhibit good pressure-bonding strength, the mass percentage of the alkyl (meth)acrylate with respect to the total mass of the polymerization components of the specific (meth)acrylate-based resin is preferably 90% by mass or more, more preferably 95% by mass or more, still more preferably 98% by mass or more, and yet more preferably 100% by mass. The alkyl (meth)acrylate in this case is preferably an alkyl (meth)acrylate having an alkyl group having 2 to 10 carbon atoms and more preferably an alkyl (meth)acrylate having an alkyl group having 4 to 8 carbon atoms.

From the viewpoint of allowing the pressure phase transition particles formed to easily undergo the pressure-induced phase transition and to exhibit good pressure-bonding strength, the mass ratio of two (meth)acrylates with the highest mass percentages among the at least two (meth) acrylates included as the polymerization components of the specific (meth)acrylate-based resin is preferably 80:20 to 20:80, more preferably 70:30 to 30:70, and still more preferably 60:40 to 40:60.

The two (meth)acrylates with the highest mass percentages among the at least two (meth)acrylates included as the polymerization components of the specific (meth)acrylate-based resin may each be an alkyl (meth)acrylate. The alkyl (meth)acrylate is preferably an alkyl (meth)acrylate having an alkyl group having 2 to 10 carbon atoms and more preferably an alkyl (meth)acrylate having an alkyl group having 4 to 8 carbon atoms.

When the two (meth)acrylates with the highest mass percentages among the at least two (meth)acrylates included as the polymerization components of the specific (meth) acrylate-based resin are each an alkyl (meth)acrylate, the difference between the numbers of carbon atoms in the alkyl groups in the two alkyl (meth)acrylates is preferably from 1 to 4 inclusive, more preferably from 2 to 4 inclusive, and still more preferably 3 or 4, from the viewpoint of allowing the pressure phase transition particles formed to easily undergo the pressure-induced phase transition and to exhibit good pressure-bonding strength.

From the viewpoint of allowing the pressure phase transition particles formed to easily undergo the pressure-induced phase transition and to exhibit good pressure-bonding strength, the specific (meth)acrylate-based resin contains preferably n-butyl acrylate and 2-ethylhexyl acrylate as polymerization components. Particularly preferably, the two (meth)acrylates with the highest mass percentages among the at least two (meth)acrylates included as the polymerization components of the specific (meth)acrylate-based resin are n-butyl acrylate and 2-ethylhexyl acrylate. The total amount of n-butyl acrylate and 2-ethylhexyl acrylate with respect to the total mass of the polymerization components of the (meth)acrylate-based resin is preferably 90% by mass or more, more preferably 95% by mass or more, still more preferably 98% by mass or more, and yet more preferably 100% by mass.

The specific (meth)acrylate-based resin may contain an additional vinyl monomer other than the (meth)acrylates as a polymerization component.

Examples of the additional vinyl monomer other that the (meth)acrylates include: (meth)acrylic acid; styrene; styrene-based monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. Any one of these vinyl monomers may be used alone, or two or more of them may be used in combination.

When the specific (meth)acrylate-based resin contains the additional vinyl monomer other than the (meth)acrylates as a polymerization component, the additional vinyl monomer other than the (meth)acrylates is preferably at least one of acrylic acid and methacrylic acid and more preferably acrylic acid.

From the viewpoint of preventing the pressure phase transition particles with no pressure applied thereto from fluidizing, the weight average molecular weight of the specific (meth)acrylate-based resin is preferably 100000 or more, more preferably 120000 or more, and still more preferably 150000 or more. From the viewpoint of allowing the pressure phase transition particles formed to easily undergo the pressure-induced phase transition, the weight average molecular weight of the specific (meth)acrylate-based resin is preferably 250000 or less, more preferably 220000 or less, and still more preferably 200000 or less.

From the viewpoint of allowing the pressure phase transition particles formed to easily undergo the pressure-induced phase transition, the glass transition temperature of the specific (meth)acrylate-based resin is preferably 10° C. or lower, more preferably 0° C. or lower, and still more preferably −10° C. or lower. From the viewpoint of preventing the pressure phase transition particles with no pressure applied thereto from fluidizing, the glass transition temperature of the specific (meth)acrylate-based resin is preferably −90° C. or higher, more preferably −80° C. or higher, and still more preferably −70° C. or higher.

From the viewpoint of allowing the pressure phase transition particles formed to easily undergo the pressure-induced phase transition, the mass percentage of the specific (meth)acrylate-based resin with respect to the total mass of the base particles is preferably 20% by mass or more, more preferably 25% by mass or more, and still more preferably 30% by mass or more. From the viewpoint of preventing the pressure phase transition particles with no pressure applied thereto from fluidizing, the mass percentage of the specific (meth)acrylate-based resin is preferably 45% by mass or less, more preferably 40% by mass or less, and still more preferably 35% by mass or less.

In the present exemplary embodiment, the total mass of the specific styrene-based resin and the specific (meth)acrylate-based resin contained in the base particles with respect to the total mass of the base particles is preferably 70% by mass or more, more preferably 80% by mass or more, yet more preferably 90% by mass or more, yet still more preferably 95% by mass or more, and even still more preferably 100% by mass.

The base particles may optionally contain, for example, polystyrene; and non-vinyl resins such as epoxy resins, polyester resins, polyurethane resins, polyamide resins, cellulose resins, polyether resins, and modified rosins.

Any one of these resins may be used alone, or two or more of them may be used in combination.

(Additional Component)

The base particles may optionally contain an additional component.

Examples of the additional component include coloring agents (such as pigments and dyes), release agents (such as hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters), and charge control agents.

The pressure phase transition particles may contain a coloring agent so long as the visibility of an image is not impaired.

From the viewpoint of increasing the transparency of the pressure phase transition particles, the content of the coloring agent in the base particles is preferably as small as possibly. Specifically, the content of the coloring agent with respect to the total mass of the base particles is preferably 1.0% by mass or less, more preferably 0.1% by mass or less, and still more preferably 0.01% by mass or less. Particularly preferably, the base particles contain no coloring agent.

The pressure phase transition particles may be transparent.

In the present exemplary embodiment, the term “transparent” means that the average light transmittance of the region onto which the pressure phase transition particles are placed is 10% or more in the visible range (from 400 nm to 700 nm inclusive), preferably 50% or more, more preferably 80% or more, and still more preferably 90% or more.

The average transmittance is measured using a spectrophotometer V700 (manufactured by JASCO Corporation).

(Structure of Base Particles)

The base particles may have a sea-island internal structure.

The sea-island structure may include a sea phase containing one of the two or more binder resins and an island phase dispersed in the sea phase and containing another one of the two or more binder resins. More specifically, from the viewpoint of facilitating the pressure-induced phase transition, the sea-island structure may include a sea phase containing the specific styrene-based resin and an island phase containing the specific (meth)acrylate-based resin and dispersed in the sea phase. The details of the specific styrene-based resin contained in the sea phase and the (meth)acrylate-based resin contained in the island phase are as described above. An island phase containing no (meth)acrylate-based resin may be dispersed in the sea phase.

When the base particles have the sea-island structure, the average diameter of the island phase is preferably from 200 nm to 500 nm inclusive. When the average diameter of the island phase is 500 nm or less, the base particles easily undergo the pressure-induced phase transition. When the average diameter of the island phase is 200 nm or more, high mechanical strength required for the base particles (strength that allows the base particles to resist deformation when they are stirred in a developing unit) is obtained. From the above points of view, the average diameter of the island phase is more preferably from 220 nm to 450 nm inclusive and still more preferably from 250 nm to 400 nm inclusive.

Examples of the method for adjusting the average diameter of the island phase in the sea-island structure within the above range include: a method in which, in a base particle production method described later, the amount of the specific (meth)acrylate-based resin with respect to the amount of the specific styrene-based resin is increased or decreased; and a method in which, in the base particle production method described later, the period of time for which the base particles are held at high temperature in the step of subjecting aggregated resin particles to fusion/coalescence is increased or decreased.

The following method is used to check the sea-island structure and measure the average diameter of the island phase.

The pressure phase transition particles are embedded in an epoxy resin and cut using, for example, a diamond knife to produce a cut piece. The cut piece produced is stained with osmium tetroxide or ruthenium tetroxide in a desiccator. The stained cut piece is observed under a scanning electron microscope (SEM). The sea phase and the island phase in the sea-island structure are distinguished from each other based on the gradation caused by the difference between the degrees of staining of the resins with osmium tetroxide or ruthenium tetroxide, and the presence of the sea-island structure is checked using the gradation. 100 Island phase domains in the SEM image are randomly selected. The major axes of the island phase domains are measured, and the average of the major axes of the 100 domains is used as the average diameter.

The base particles may have a single-layer structure or may have a core-shell structure including a core portion and a shell layer coating the core portion. From the viewpoint of preventing the pressure phase transition particles with no pressure applied thereto from fluidizing, the base particles may have the core-shell structure.

When the base particles have the core-shell structure, the core portion may contain the specific styrene-based resin and the specific (meth)acrylate-based resin from the viewpoint of facilitating the pressure-induced phase transition. Moreover, from the viewpoint of preventing the pressure phase transition particles with no pressure applied thereto from fluidizing, the shell layer may contain the specific styrene-based resin.

When the base particles have the core-shell structure, the core portion may include the sea phase containing the specific styrene-based resin and the island phase containing the specific (meth)acrylate-based resin and dispersed in the sea phase. The average diameter of the island phase may fall within the above-described range. The core portion may have the structure described above, and the shell layer may contain the specific styrene-based resin. In the structure in this case, the sea phase in the core portion is continuous with the shell layer, so that the base particles easily undergo the pressure-induced phase transition.

Examples of the resin contained in the shell layer include polystyrene; and non-vinyl resins such as epoxy resins, polyester resins, polyurethane resins, polyamide resins, cellulose resins, polyether resins, and modified rosins.

Any one of these resins may be used alone, or two or more of them may be used in combination.

From the viewpoint of preventing the deformation of the base particles, the average thickness of the shell layer is preferably 120 nm or more, more preferably 130 nm or more, and still more preferably 140 nm or more. From the viewpoint of facilitating the pressure-induced phase transition of the base particles, the average thickness of the shell layer is preferably 550 nm or less, more preferably 500 nm or less, and still more preferably 400 nm or less.

The average thickness of the shell layer is measured by the following method.

The particles are embedded in an epoxy resin and cut using, for example, a diamond knife to produce a cut piece. The cut piece produced is stained with osmium tetroxide or ruthenium tetroxide in a desiccator. The stained cut piece is observed under a scanning electron microscope (SEM). Cross sections of 10 base particles in the SEM image are randomly selected. The thickness of the shell layer of each base particle is measured at 20 points, and the average of the thicknesses is computed. Then the average value of the average thicknesses of the 10 base particles is used as the average thickness.

From the viewpoint of ease of handling of the base particles, the volume average particle diameter (D50v) of the base particles is preferably 4 μm or more, more preferably 5 μm or more, and still more preferably 6 μm or more. The volume average particle diameter of the base particles is preferably 15 μm or less, more preferably 12 μm or less, and still more preferably 10 μm or less.

The volume average particle diameter (D50v) of the base particles is measured using Coulter Multisizer II (manufactured by Beckman Coulter, Inc.) and an aperture having an aperture diameter of 100 μm. 0.5 mg to 50 mg of the base particles are added to 2 mL of a 5% by mass aqueous sodium alkylbenzenesulfonate solution and dispersed therein. Then the mixture is mixed with 100 mL to 150 mL of an electrolyte (ISOTON-II manufactured by Beckman Coulter, Inc.), and the resulting mixture is subjected to dispersion treatment using an ultrasonic disperser for 1 minute, and the dispersion obtained is used as a sample. The diameters of 50000 particles having diameters of from 2 μm to 60 μm inclusive in the sample are measured. The particle diameter at which the cumulative frequency cumulated from the small diameter side in the volume-based particle size distribution is 50% is defined the volume average particle diameter D50v.

[External Additive]

Examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, CaO $SiO_2$, $K_2O$ $(TiO_2)_n$, $Al_2O_3 \cdot 2SiO_2$, $CaCO_3$, $MgCO_3$, $BaSO_4$, and $MgSO_4$.

The surfaces of the inorganic particles used as the external additive may be subjected to hydrophobic treatment. The hydrophobic treatment is performed, for example, by immersing the inorganic particles in a hydrophobic treatment agent. No particular limitation is imposed on the hydrophobic treatment agent. Examples of the hydrophobic treatment agent include silane-based coupling agents, silicone oils, titanate-based coupling agents, and aluminum-based coupling agents. One of these hydrophobic treatment agents may be used alone, or two or more of them may be used in combination. The amount of the hydrophobic treatment agent is, for example, from 1 part by mass to 10 parts by mass inclusive based on 100 parts by mass of the inorganic particles.

Other examples of the external additive include resin particles (particles of resins such as polystyrene, polymethyl methacrylate, and melamine resin) and cleaning activators (such as a metal salt of a higher fatty acid typified by zinc stearate and particles of a fluorine-based high-molecular weight material).

The amount of the external additive to be added externally with respect to the mass of the base particles is preferably from 0.01% by mass to 5% by mass inclusive and more preferably from 0.01% by mass to 2.0% by mass or less inclusive.

[Properties of Pressure Phase Transition Particles]

The pressure phase transition particles have at least two glass transition temperatures. One of the glass transition temperatures may be a glass transition temperature derived from one of the two or more binder resins, and another one of the glass transition temperatures may be a glass transition temperature derived from another one of the two or more binder resins. As described above, when the binder resins include the specific styrene-based resin and the specific (meth)acrylate-based resin, one of the glass transition temperatures may be the glass transition temperature of the specific styrene-based resin, and another one may be the glass transition temperature of the specific (meth)acrylate-based resin.

The pressure phase transition particles may have three or more glass transition temperatures, but the number of glass transition temperatures is preferably 2. Examples of the pressure phase transition particles having two glass transition temperatures include: pressure phase transition particles in which the resins contained therein include only the specific styrene-based resin and the specific (meth)acrylate-based resin; and pressure phase transition particles that contain a small amount of an additional resin other than the specific styrene-based resin and the specific (meth)acrylate-based resin (for example, the content of the additional resin with respect to the total mass of the pressure phase transition particles is 5% by mass or less).

The pressure phase transition particles have at least two glass transition temperatures, and the difference between the lowest glass transition temperature and the highest glass transition temperature is 30° C. or more. From the viewpoint of facilitating the pressure-induced phase transition of the pressure phase transition particles, the difference between the lowest glass transition temperature and the highest glass transition temperature is more preferably 40° C. or more, still more preferably 50° C. or more, and yet more preferably 60° C. or more. The upper limit of the difference between the lowest glass transition temperature and the highest glass transition temperature is, for example, 140° C. or less, 130° C. or less, and 120° C. or less.

From the viewpoint of facilitating the pressure-induced phase transition of the pressure phase transition particles, the lowest glass transition temperature of the pressure phase transition particles is preferably 10° C. or lower, more preferably 0° C. or lower, and still more preferably −10° C. or lower. From the viewpoint of preventing the pressure phase transition particles with no pressure applied thereto from fluidizing, the lowest glass transition temperature is preferably −90° C. or higher, more preferably −80° C. or higher, and still more preferably −70° C. or higher.

From the viewpoint of preventing the pressure phase transition particles with no pressure applied thereto from fluidizing, the highest glass transition temperature of the pressure phase transition particles is preferably 30° C. or higher, more preferably 40° C. or higher, and still more preferably 50° C. or higher. From the viewpoint of facilitating the pressure-induced phase transition of the pressure phase transition particles, the highest glass transition temperature is preferably 70° C. or lower, more preferably 65° C. or lower, and still more preferably 60° C. or lower.

The glass transition temperatures of the pressure phase transition particles are determined by compressing the pressure phase transition particles to produce a plate-shaped sample, subjecting the sample to differential scanning calorimetry, and using a differential scanning calorimetry (DSC) curve obtained. More specifically, the glass transition temperatures are determined from "extrapolated glass transition onset temperature" described in glass transition temperature determination methods in "Testing methods for transition temperatures of plastics" in JIS K7121-1987.

The pressure phase transition particles are particles that undergo the pressure-induced phase transition and satisfy the following formula 1.

$$10^\circ\ C. \leq T1 - T2 \qquad \text{Formula 1}$$

In formula 1, T1 is the temperature at which the viscosity of the pressure phase transition particles at a pressure of 1 MPa is 10000 Pa·s, and T2 is the temperature at which the viscosity at a pressure of 10 MPa is 10000 Pas. The method for determining T1 and T2 will be described later.

From the viewpoint of facilitating the pressure-induced phase transition of the pressure phase transition particles, the temperature difference (T1−T2) is preferably 10° C. or more, more preferably 15° C. or more, and still more preferably 20° C. or more. From the viewpoint of preventing the pressure phase transition particles with no pressure applied thereto from fluidizing, the temperature difference (T1−T2) is preferably 120° C. or less, more preferably 100° C. or less, and still more preferably 80° C. or less.

The value of T1 is preferably 140° C. or lower, more preferably 130° C. or lower, still more preferably 120° C. or lower, and yet more preferably 115° C. or lower. The lower limit of the temperature T1 is preferably 80° C. or higher and more preferably 85° C. or higher.

The value of T2 is preferably 40° C. or higher, more preferably 50° C. or higher, and still more preferably 60° C. or higher. The upper limit of the temperature T2 may be 85° C. or lower.

One index indicating the susceptibility of the pressure phase transition particles to undergo the pressure-induced phase transition is the temperature difference (T1-T3), where T1 is the temperature at which the viscosity of the pressure phase transition particles at a pressure of 1 MPa is 10000 Pa·s, and T3 is the temperature at which the viscosity at a pressure of 4 MPa is 10000 Pa·s. The temperature difference (T1−T3) may be 5° C. or more. The temperature difference (T1−T3) is generally 25° C. or less.

From the viewpoint of facilitating the pressure-induced phase transition, the temperature difference (T1−T3) in the pressure phase transition particles is preferably 5° C. or more and more preferably 10° C. or more.

The upper limit of the temperature difference (T1−T3) is generally 25° C. or less.

From the viewpoint of adjusting the temperature difference (T1−T3) to 5° C. or more, the temperature T3 at which the viscosity of the pressure phase transition particles at a pressure of 4 MPa is 10000 Pa·s is preferably 90° C. or lower, more preferably 85° C. or lower, and still more preferably 80° C. or lower. The lower limit of the temperature T3 may be 60° C. or higher.

The temperature T1, the temperature T2, and the temperature T3 are determined using the following method.

The pressure phase transition particles are compressed to produce a pellet-shaped sample. The pellet-shaped sample is placed in a flow tester (CFT-500 manufactured by Shimadzu Corporation). The pressure applied is fixed to 1 MPa, and the viscosity at 1 MPa is measured versus temperature. Then the temperature T1 at which the viscosity at an applied pressure of 1 MPa is $10^4$ Pa·s is determined from the viscosity graph obtained. The temperature T2 is determined using the same procedure as that for the temperature T1 except that the applied pressure is changed from 1 MPa to 10 MPa. The temperature T3 is determined using the same procedure as that for the temperature T1 except that the applied pressure is changed from 1 MPa to 4 MPa. The temperature T1 and the temperature T2 are used to compute the temperature difference (T1−T2). The temperature T1 and the temperature T3 are used to compute the temperature difference (T1−T3).

[Method for Producing Pressure Phase Transition Particles]

The pressure phase transition particles are obtained by producing the base particles and then externally adding the external additive to the base particles.

The base particles may be produced by a dry production method (such as a kneading-grinding method) or by a wet production method (such as an aggregation/coalescence method, a suspension polymerization method, or a dissolution/suspension method). No particular limitation is imposed on the production method, and any known production method may be used. In particular, the aggregation/coalescence method may be used to obtain the base particles.

A method for producing the base particles by the aggregation/coalescence method will be shown as an example.

When the base particles are produced by the aggregation/coalescence method, the base particles are produced, for example, through the steps of:

preparing a styrene-based resin particle dispersion containing dispersed therein styrene-based resin particles containing the specific styrene-based resin (a styrene-based resin particle dispersion preparation step);

polymerizing the specific (meth)acrylate-based resin in the styrene-based resin particle dispersion to form composite resin particles containing the specific styrene-based resin and the specific (meth)acrylate-based resin (a composite resin particle forming step);

aggregating the composite resin particles in the composite resin particle dispersion containing the composite resin particles dispersed therein to form aggregated particles (an aggregated particle forming step); and heating the aggregated particle dispersion containing the aggregated particles dispersed therein to subject the aggregated particles to fusion/coalescence to thereby form base particles (a fusion/coalescence step).

The details of the above steps will be described.

In the following description, the method for obtaining base particles containing no release agent will be described. A release agent and other additives may be optionally used.

When the base particles contain a coloring agent and/or a release agent, the composite resin particle dispersion is mixed with a coloring agent particle dispersion and/or a release agent particle dispersion in the aggregated particle forming step, and the composite resin particles and the coloring agent and/or the release agent are aggregated to form aggregated particles.

The coloring agent particle dispersion and the release agent particle dispersion are each produced, for example, by mixing the coloring agent or the release agent with a dispersion medium, and the mixture is subjected to dispersion treatment using a well-known dispersing device.

—Styrene-Based Resin Particle Dispersion Preparation Step—

In the styrene-based resin particle dispersion preparation step, the styrene-based resin particle dispersion containing dispersed therein the styrene-based resin particles containing the specific styrene-based resin is prepared.

The styrene-based resin particle dispersion is, for example, a dispersion prepared by dispersing the styrene-based resin particles in a dispersion medium using a surfactant.

Examples of the dispersion medium include water-based mediums such as water and alcohols. Any of these mediums may be used alone, or two or more of them may be used in combination.

Examples of the surfactant include: anionic surfactants such as sulfate-based surfactants, sulfonate-based surfactants, phosphate-based surfactants, and soap-based surfactants; cationic surfactants such as amine salt-based surfactants and quaternary ammonium salt-based surfactants; and nonionic surfactants such as polyethylene glycol-based surfactants, alkylphenol ethylene oxide adduct-based surfactants, and polyhydric alcohol-based surfactants. A nonionic surfactant may be used in combination with an anionic surfactant or a cationic surfactant. Among the above surfactants, anionic surfactants may be used. Any of the above surfactants may be used alone, or two or more of them may be used in combination.

Examples of the method for dispersing the styrene-based resin particles in the dispersion medium include a method including mixing the specific styrene-based resin and the dispersion medium and stirring the mixture using a rotary shearing-type homogenizer, a ball mill using media, a sand mill, or a dyno-mill to disperse the styrene-based resin particles.

Another method for dispersing the styrene-based resin particles in the dispersion medium is an emulsion polymerization method. Specifically, the polymerization components of the specific styrene-based resin and a chain transfer agent or a polymerization initiator are mixed, and a water-based medium containing the surfactant is further mixed. The mixture is stirred to produce an emulsion, and the styrene-based resin is polymerized in the emulsion. In this case, the chain transfer agent used may be dodecanethiol.

The volume average particle diameter of the styrene-based resin particles dispersed in the styrene-based resin particle dispersion is preferably from 100 nm to 250 nm inclusive, more preferably from 120 nm to 220 nm inclusive, and still more preferably from 150 nm to 200 nm inclusive.

The volume average particle diameter of the resin particles contained in the resin particle dispersion is determined as follows. The diameters of the particles are measured using a laser diffraction particle size distribution measurement apparatus (e.g., LA-700 manufactured by HORIBA Ltd.), and the particle diameter at which the cumulative frequency in the volume-based particle size distribution computed from the small-diameter side is 50% is defined as the volume average particle diameter (D50v).

The content of the styrene-based resin particles contained in the styrene-based resin particle dispersion with respect to the total mass of the styrene-based resin particle dispersion is preferably from 30% by mass to 60% by mass inclusive and more preferably from 40% by mass to 50% by mass inclusive.

—Composite Resin Particle Forming Step—

In the composite resin particle forming step, the specific (meth)acrylate-based resin is polymerized in the styrene-based resin particle dispersion to form the composite resin particles containing the specific styrene-based resin and the specific (meth)acrylate-based resin.

In the composite resin particle forming step, the styrene-based resin particle dispersion and the polymerization components of the specific (meth)acrylate-based resin are mixed, and the specific (meth)acrylate-based resin is polymerized in the styrene-based resin particle dispersion to form the composite resin particles containing the specific styrene-based resin and the specific (meth)acrylate-based resin.

The composite resin particles may contain the specific styrene-based resin and the specific (meth)acrylate-based resin that are microscopically phase-separated. These resin particles are produced, for example, by the following method.

The polymerization components of the specific (meth)acrylate-based resin (a group of monomers including at least two (meth)acrylates) are added to the styrene-based resin particle dispersion, and a water-based medium is optionally added. Next, while the dispersion is slowly stirred, the temperature of the dispersion is increased to a temperature equal to or higher than the glass transition temperature of the specific styrene-based resin (for example, a temperature higher by 10° C. to 30° C. than the glass transition temperature of the specific styrene-based resin). Next, while the temperature is maintained, a water-based medium containing a polymerization initiator is slowly added dropwise, and the mixture is continuously stirred for a long time in the range of from 1 hour to 15 hours inclusive. In this case, ammonium persulfate may be used as the polymerization initiator.

It is inferred that, when the above method is used, the styrene-based resin particles are impregnated with the monomers and the polymerization initiator and the specific (meth)acrylate-based resin is polymerized in the styrene-based resin particles, although the detailed mechanism of this process is unclear. In this case, the specific (meth)acrylate-based resin is contained in the styrene-based resin particles, and the composite resin particles in which the specific styrene-based resin and the specific (meth)acrylate-based resin are microscopically phase-separated in the particles may thereby be obtained.

The volume average particle diameter of the composite resin particles dispersed in the composite resin particle dispersion is preferably from 140 nm to 300 nm inclusive, more preferably from 150 nm to 280 nm inclusive, and still more preferably from 160 nm to 250 nm inclusive.

The content of the composite resin particles contained in the composite resin particle dispersion with respect to the total mass of the composite resin particle dispersion is preferably from 20% by mass to 50% by mass inclusive and more preferably from 30% by mass to 40% by mass inclusive.

—Aggregated Particle Forming Step—

In the aggregated particle forming step, the composite resin particles in the composite resin particle dispersion containing the composite resin particles dispersed therein are aggregated to form aggregated particles.

In the aggregated particle forming step, the composite resin particles are aggregated to form aggregated particles having diameters close to the target diameter of the base particles.

Specifically, for example, in the aggregated particle forming step, a flocculant is added to the composite resin particle dispersion, and the pH of the composite resin particle dispersion is adjusted to acidic (for example, a pH of from 2 to 5 inclusive). Then a dispersion stabilizer is optionally added, and the resulting mixture is heated to a temperature close to the glass transition temperature of the specific styrene-based resin (specifically, for example, a temperature from the glass transition temperature of the specific styrene-based resin −30° C. to the glass transition temperature −10° C. inclusive) to aggregate the composite resin particles to thereby form aggregated particles.

In the aggregated particle forming step, the flocculant may be added at room temperature (e.g., 25° C.) while the composite resin particle dispersion is stirred, for example, in a rotary shearing-type homogenizer. Then the pH of the composite resin particle dispersion may be adjusted to acidic (e.g., a pH of from 2 to 5 inclusive), and the dispersion stabilizer may be optionally added. Then the resulting mixture may be heated.

Examples of the flocculant include a surfactant with a polarity opposite to the polarity of the surfactant contained in the composite resin particle dispersion, inorganic metal salts, and divalent or higher polyvalent metal complexes. When a metal complex is used as the flocculant, the amount of the surfactant used is small, and charging characteristics are improved.

An additive that forms a complex with a metal ion in the flocculant or a similar bond may be used in combination with the flocculant. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

In the fusion/coalescence step, the aggregated particle dispersion containing the aggregated particles dispersed therein is heated to subject the aggregated particles to fusion/coalescence to thereby form the base particles.

In the fusion/coalescence step, the aggregated particle dispersion containing the aggregated particles dispersed therein is heated to, for example, a temperature equal to or higher than the glass transition temperature of the specific styrene-based resin (for example, a temperature higher by 10° C. to 30° C. than the glass transition temperature of the specific styrene-based resin) to subject the aggregated particles to fusion/coalescence to thereby form the base particles.

The base particles obtained through the above steps generally have a sea-island structure including a sea phase containing the specific styrene-based resin and an island phase dispersed in the sea phase and containing the specific (meth)acrylate-based resin. In the composite resin particles, the specific styrene-based resin and the specific (meth) acrylate-based resin are microscopically phase-separated. In the fusion/coalescence step, it is inferred that the specific styrene-based resin domains coalesce and form the sea phase and the specific (meth)acrylate-based resin domains coalesce and form the island phase.

The average diameter of the island phase in the sea-island structure is controlled, for example, by increasing or decreasing the amount of the styrene-based resin particle dispersion or the at least two (meth)acrylates used in the composite resin particle forming step or increasing or decreasing the period of time for which the high temperature is maintained in the fusion/coalescence step.

The base particles having the core-shell structure are produced, for example, through the steps of:

after the aggregated particle dispersion (hereinafter referred to as a first aggregated particle dispersion containing first aggregated particles dispersed therein) has been obtained in the aggregated particle forming step described above, further mixing the aggregated particle dispersion and the styrene-based resin particle dispersion to aggregate these particles such that the styrene-based resin particles further adhere to the surface of the aggregated particles to form second aggregated particles (a second aggregated particle forming step); and heating the second aggregated particle dispersion containing the second aggregated particles dispersed therein to subject the second aggregated particles to fusion/coalescence to thereby form the base particles having the core-shell structure (a core-shell structure forming step).

The base particles obtained through the above steps have the core-shell structure including the shell layer containing the specific styrene-based resin.

Instead of the styrene-based resin particle dispersion, a resin particle dispersion containing other resin particles dispersed therein may be used to form a shell layer containing the other resin.

After completion of the fusion/coalescence step, the base particles formed in the solution are subjected to a well-known washing step, a solid-liquid separation step, and a drying step to obtain dried base particles.

From the viewpoint of chargeability, the base particles may be subjected to displacement washing with ion exchanged water sufficiently in the washing step. From the viewpoint of productivity, suction filtration, pressure filtration, etc. may be performed in the solid-liquid separation step. From the viewpoint of productivity, freeze-drying, flash drying, fluidized drying, vibrating fluidized drying, etc. may be performed in the drying step.

The pressure phase transition particles are produced, for example, by adding the external additive to the dried base particles obtained and mixing them.

The mixing may be performed, for example, using a V blender, a Henschel mixer, a Loedige mixer, etc.

If necessary, coarse particles in the particles obtained may be removed using a vibrating sieving machine, an air sieving machine, etc.

The pressure phase transition particles may be applied without any treatment and may be used as an electrostatic image developer. The electrostatic image developer may be a one-component developer containing only the pressure phase transition particles or may be a two-component developer containing a mixture of the pressure phase transition particles and a carrier.

No particular limitation is imposed on the carrier, and any well-known carrier may be used. Examples of the carrier include: a coated carrier prepared by coating the surface of a core material formed of a magnetic powder with a resin; a magnetic powder-dispersed carrier prepared by dispersing a magnetic powder in a matrix resin; and a resin-impregnated carrier prepared by impregnating a porous magnetic powder with a resin. In each of the magnetic powder-dispersed carrier and the resin-impregnated carrier, the particles forming the carrier may be used as cores, and the cores may be coated with a resin.

Examples of the magnetic powder include: magnetic metal powders such as iron powder, nickel powder, and cobalt powder; and magnetic oxide powders such as ferrite powder and magnetite powder.

Examples of the coating resin and the matrix resin include polyethylene, polypropylene, polystyrene, polyvinyl acetate, polyvinyl alcohol, polyvinyl butyral, polyvinyl chloride, polyvinyl ethers, polyvinyl ketones, vinyl chloride-vinyl acetate copolymers, styrene-acrylate copolymers, straight silicone resins having organosiloxane bonds and modified products thereof, fluorocarbon resins, polyesters, polycarbonates, phenolic resins, and epoxy resins. The coating resin and the matrix resin may contain an additional additive such as electrically conductive particles. Examples of the electrically conductive particles include: particles of metals such as gold, silver, and copper; and particles of carbon black, titanium oxide, zinc oxide, tin oxide, barium sulfate, aluminum borate, and potassium titanate.

To coat the surface of the core material with a resin, the surface of the core material may be coated with a coating layer-forming solution prepared by dissolving the coating resin and various optional additives in an appropriate solvent. No particular limitation is imposed on the solvent, and the solvent may be selected in consideration of the type of resin used, ease of coating, etc.

Specific examples of the resin coating method include: an immersion method in which the core material is immersed in the coating layer-forming solution; a spray method in which the coating layer-forming solution is sprayed onto the surface of the core material; a fluidized bed method in which the coating layer-forming solution is sprayed onto the core material floated by the flow of air; and a kneader-coater method in which the core material of the carrier and the coating layer-forming solution are mixed in a kneader coater and then the solvent is removed.

The mixing ratio (mass ratio) of the pressure phase transition particles and the carrier in the two-component developer is preferably particles:carrier=1:100 to 30:100 and more preferably 3:100 to 20:100.

EXAMPLES

The exemplary embodiments of the disclosure will be described in detail by way of Examples. However, the exemplary embodiments of the disclosure are not limited to these Examples. In the following description, “parts” and “%” are based on mass, unless otherwise specified.

Example A

<Production of Pressure Phase Transition Particles>

[Preparation of Styrene-Based Resin Particle Dispersion (A1) and Composite Resin Particle Dispersion (A1)]

Styrene: 450 parts n-Butyl acrylate: 140 parts

Acrylic acid: 20 parts

Dodecanethiol: 10 parts

The above components are mixed and dissolved to prepare a monomer solution.

10 Parts of an anionic surfactant (DOWFAX 2A1 manufactured by Dow Chemical Company) is dissolved in 250 parts of ion exchanged water, and the monomer solution is added thereto. The resulting mixture is dispersed in a flask and then emulsified to thereby obtain an emulsion.

1 Part of an anionic surfactant (DOWFAX 2A1 manufactured by Dow Chemical Company) is dissolved in 555 parts of ion exchanged water, and the mixture is placed in a polymerization flask equipped with a stirrer, a thermometer, a reflux condenser tube, and a nitrogen gas introduction tube. While nitrogen is introduced into the polymerization flask, the polymerization flask is heated to 75° C. in a water bath under gentle stirring and held at 75° C.

9 Parts of ammonium persulfate is dissolved in 43 parts of ion exchanged water. The resulting mixture is added dropwise to the polymerization flask over 20 minutes using a metering pump, and the emulsion is added dropwise to the polymerization flask over 200 minutes using a metering pump.

Then the polymerization flask is held at 75° C. for 3 hours under continuous stirring and returned to room temperature (25° C.), and first polymerization is thereby finished.

A styrene-based resin particle dispersion (A1) containing styrene-based resin particles is thereby obtained. The resin particles have a volume average particle diameter (D50v) of 195 nm, and the styrene-based resin has a glass transition temperature of 53° C. and a weight average molecular weight of 32,000 as determined by GPC (UV detection).

Next, a polymerization flask containing the styrene-based resin particle dispersion (A1) cooled to room temperature (25° C.) is charged with 240 parts of 2-ethylhexyl acrylate, 160 parts of n-butyl acrylate, and 1200 parts of ion exchanged water, and the resulting mixture is slowly stirred for 2 hours.

Then the mixture is heated to 70° C. under continuous stirring, and 4.5 parts of ammonium persulfate and 100 parts of ion exchanged water are added dropwise over 20 minutes using a metering pump. Then the mixture is held for 3 hours under continuous stirring, and the polymerization is finished.

A composite resin particle dispersion (A1) is obtained through the above steps. The composite resin particles have a volume average particle diameter (D50v) of 240 nm, and the composite resin has a weight average molecular weight of 133,000 as determined by GPC (UV detection) and a number average molecular weight of 18,000. The solid content of the composite resin particle dispersion (A1) is adjected to 30% by adding ion exchanged water.

The composite resin particles in the obtained composite resin particle dispersion (A1) are dried, and the dried composite resin particles are embedded in an epoxy resin to produce a sample. The sample is cut using a diamond knife to produce a cross-sectional cut piece of the composite resin particles. The cross-section of the sample is stained with ruthenium tetroxide vapor and observed under a transmission electron microscope. The results of the observation of the cross section of the composite resin particles show that the composite resin particles have a structure in which a plurality of low-Tg (meth)acrylate resin domains are dispersed in a high-Tg styrene resin matrix.

A differential scanning calorimeter (DSC) manufactured by Shimadzu Corporation is used to analyze the behavior of the glass transition temperatures Tg of the dried composite resin particles from −150° C., and the glass transition of the low-Tg (meth)acrylate resin is observed at −60° C. Moreover, the glass transition of the high-Tg styrene resin is observed at 53° C. (glass transition temperature difference: 113° C.)

[Preparation of Styrene-Based Resin Particle Dispersion (B1)]

Styrene: 450 parts n-Butyl acrylate: 135 parts

Acrylic acid: 12 parts

Dodecanethiol: 9 parts

The above components are mixed and dissolved to prepare a monomer solution.

Separately, 10 parts of an anionic surfactant (DOWFAX 2A1 manufactured by Dow Chemical Company) is dissolved in 250 parts of ion exchanged water, and the monomer solution is added thereto, dispersed in a flask, and then emulsified to obtain an emulsion.

1 Part of an anionic surfactant (DOWFAX 2A1 manufactured by Dow Chemical Company) is dissolved in 555 parts of ion exchanged water, and the mixture is charged into a polymerization flask equipped with a stirrer, a thermometer, a reflux condenser tube, and a nitrogen gas introduction tube. While nitrogen is introduced into the polymerization flask, the polymerization flask is heated to 75° C. under gentle stirring in a water bath and held at 75° C.

9 Parts of ammonium persulfate is dissolved in 43 parts of ion exchanged water, and the mixture is added dropwise to the polymerization flask over 20 minutes using a metering pump, and then the emulsion is added dropwise thereto over 200 minutes using a metering pump.

Then the polymerization flask is held at 75° C. for 3 hours under continuous stirring and returned to room temperature (25° C.), and first polymerization is thereby finished.

A styrene-based resin particle dispersion (B1) containing styrene-based resin particles is thereby obtained. The resin particles have a volume average particle diameter (D50v) of 190 nm, and the styrene-based resin has a glass transition temperature of 53° C. and a weight average molecular weight of 33,000 as determined by GPC (UV detection). The solid content of the styrene-based resin particle dispersion (B1) is adjusted to 40% by mass by adding ion exchanged water.

[Preparation of Release Agent Dispersion (A1)]

Fischer-Tropsch wax: 270 parts (product name: FNP-0090 manufactured by Nippon Seiro Co., Ltd., melting temperature=90° C.)

Anionic surfactant: 1.0 parts (Neogen RK manufactured by DAI-ICHI KOGYO SEIYAKU Co., Ltd.)

Ion exchanged water: 400 parts

The above components are mixed, heated to 95° C., dispersed using a homogenizer (ULTRA-TURRAX T50 manufactured by IKA), and subjected to dispersion treatment for 360 minutes using a Manton-Gaulin high-pressure homogenizer (manufactured by Gaulin Corporation) to thereby prepare a release agent dispersion (A1) (solid concentration: 20% by mass) containing dispersed therein a release agent having a volume average particle diameter of 0.23 μm.

[Preparation of Pressure Phase Transition Particles (A1) and Developer (A1)]

Composite resin particle dispersion (A1): 600 parts

Release agent dispersion (A1): 8 parts

Aqueous colloidal silica solution: 13 parts (SNOWTEX OS manufactured by Nissan Chemical Corporation)

Ion exchanged water: 1000 parts

Anionic surfactant: 1 part (DOWFAX 2A1 manufactured by Dow Chemical Company)

The above components are placed in a 3 L reaction vessel equipped with a thermometer, a pH meter, and a stirrer, and a 1.0 mass % aqueous nitric acid solution is added at a temperature of 25° C. to adjust the pH to 3.0. Then, while the mixture is dispersed at 5,000 rpm using a homogenizer (ULTRA-TURRAX T50 manufactured by IKA Japan), 4 parts of a 10 mass % aqueous polyaluminum chloride solution prepared is added, and the mixture is dispersed for 6 minutes.

Then a heating mantle is attached to the reaction vessel. While the rotation speed of the stirrer is controlled such that the slurry is stirred sufficiently, the temperature of the slurry is increased at a heating rate of 0.2° C./minute until the temperature reaches 40° C. and then at a heating rate of 0.05° C./minute after the temperature has exceeded 40° C., and the particle diameters are measured at 10 minute intervals using Coulter Multisizer II (manufactured by Coulter, aperture diameter: 50 μm). When the volume average particle diameter has reached 7.5 μm, the temperature is held constant, and 115 parts of the styrene-based resin particle dispersion (B1) is added over 5 minutes. After completion of the addition, the slurry is held for 30 minutes, and a 1.0 mass % aqueous sodium hydroxide solution is used to adjust the pH of the slurry to 6.0. Then the temperature is increased to 96° C. at a heating rate of 1° C./minute while the pH is adjusted to 6.0 at 5° C. intervals, and the slurry is held at 96° C. An optical microscope and a field emission transmission electron microscope (FE-SEM) are used to observe the shapes of the particles and their surface properties. Coalescence of the particles is found after a lapse of 2.0 hours, and then the container is cooled using cooling water to 30° C. over 5 minutes.

The cooled slurry is allowed to pass through a nylon mesh with a mesh size of 30 μm to remove coarse particles, and the slurry passing through the mesh is filtered using an aspirator under reduced pressure. The solids remaining on the paper filter are pulverized by hand as finely as possible and added to ion exchanged water at a temperature of 30° C. The amount of the ion exchanged water is 10 times the amount of the solids. Then the mixture is stirred for 30 minutes and filtered using an aspirator under reduced pressure, and the solids remaining on the paper filer are pulverized by hand as finely as possible and added to ion exchanged water at a temperature of 30° C. The amount of the ion exchanged water is 10 times the amount of the solids. Then the mixture is stirred for 30 minutes and again filtered using an aspirator under reduced pressure, and the electric conductivity of the filtrate is measured. This procedure is repeated until the electric conductivity of the filtrate becomes 10 μS/cm or less to wash the solids.

The washed solids are finely pulverized using a wet and dry granulator (Comil) and vacuum-dried using a dryer at 25° C. for 36 hours to thereby obtain base particles (A1). The obtained base particles (A1) have a volume average particle diameter of 8.1 μm, a weight average molecular weight of 126,000, and a number average molecular weight of 17,000.

Next, 1.5 parts of hydrophobic silica (RY50 manufactured by Nippon Aerosil Co., Ltd.) is added to 100 parts of the obtained base particles (A1), and the mixture is stirred at a rotation speed of 13000 rpm for 30 seconds using a sample mill. Then the mixture is sieved using a vibrating sieve with a mesh size of 45 μm to prepare pressure phase transition particles (A1). The obtained pressure phase transition particles (A1) have a volume average particle diameter of 8.4 μm.

The pressure phase transition particles (A1) are used as a sample, and their thermal behavior is analyzed in the temperature range of −150° C. to 100° C. using a differential scanning calorimeter (DSC-60A manufactured by Shimadzu Corporation). The sample observed has glass transition temperatures at 60° C. and 53° C.

The temperatures T1 and T2 of the pressure phase transition particles (A1) are determined using the measurement method described above, and the pressure phase transition particles (A1) are found to satisfy formula 1 "10° C.≤T1−T2."

A cross section of the pressure phase transition particles (A1) is observed under a scanning electron microscope (SEM), and the sea-island structure is found. The pressure phase transition particles (A1) each have a core portion including the island phase and a shell layer including no island phase. The sea phase contains the styrene-based resin, and the island phase contains the (meth)acrylate-based resin. The average diameter of the island phase is determined using the above-described measurement method and found to be 250 nm.

The temperature difference (T1−T3) of the pressure phase transition particles (A1) that is an index indicating the susceptibility of the pressure phase transition particles to undergo the pressure-induced phase transition is determined. Specifically, a flow tester (CFT-500 manufactured by Shimadzu Corporation) is used to measure the temperatures T1 and T3. The temperature T3 is found to be 76° C., and the temperature difference (T1−T3) is found to be 17° C.

8 Parts of the pressure phase transition particles (A1) and 100 parts of a resin-coated carrier described below are placed in a V blender, stirred for 20 minutes, and sieved using a vibrating sieve with a mesh size of 212 μm to thereby obtain a developer (A1).

14 Parts of toluene, 2 parts of a styrene-methyl methacrylate copolymer (mass ratio: 80/20, weight average molecular weight: 70000), and 0.6 parts of MZ500 (zinc oxide, Titan Kogyo, Ltd.) are mixed and stirred using a stirrer for 10 minutes to prepare a coating layer-forming solution containing the zinc oxide dispersed therein. Next, the coating layer-forming solution and 100 parts of ferrite particles (volume average particle diameter: 38 μm) are placed in a vacuum degassed-type kneader and stirred at 60° C. for 30 minutes, degassed under reduced pressure while heated, and then dried to produce the resin-coated carrier.

<Preparation of Image Portion-Forming Toners and Image Portion-Forming Developers>

[Crystalline Polyester Resin Dispersion (A2)]

A heat-dried three-neck flask is charged with monomer components including dimethyl sebacate and nonanediol at a ratio of 100 mol %: 100 mol % and dibutyl tin oxide used as a catalyst in an amount of 0.3 parts with respect to 100 parts of the monomer components. Then air inside the flask is replaced with nitrogen gas by a pressure reducing operation to obtain an inert atmosphere, and the mixture is mechanically stirred at reflux at 180° C. for 4 hours.

Next, the temperature is gradually increased to 230° C. under reduced pressure, and the mixture is stirred for 2 hours. When the mixture turns viscous, the resulting mixture is air-cooled to stop the reaction, and a crystalline polyester resin (A2) is thereby synthesized. Then the obtained crystalline polyester resin (A2) is subjected to (polystyrene-equivalent) molecular weight measurement by gel permeation chromatography. The weight average molecular weight (Mw) of the obtained crystalline polyester resin (A2) is found to be 15300, and its number average molecular weight (Mn) is found to be 3800. The acid value of the crystalline polyester resin (A2) is found to be 13.5 mgKOH/g.

The melting point (Tm) of the crystalline polyester resin (A2) is measured using a differential scanning calorimeter (DSC). A clear endothermic peak is found, and the endothermic peak temperature is found to be 77.2° C.

Next, the crystalline polyester resin (A2) is used to prepare a resin particle dispersion as follows.

Crystalline polyester resin (A2): 90 parts

Ionic surfactant (Neogen RK, DAI-ICHI KOGYO SEIYAKU Co., Ltd.): 1.8 parts

Ion exchanged water: 210 parts

The above components are mixed, heated to 100° C., dispersed using a homogenizer (ULTRA-TURRAX T50 manufactured by IKA), heated to 110° C. using a pressure ejection-type Gaulin homogenizer, and then subjected to dispersion treatment for 1 hour to thereby obtain a crystalline polyester resin dispersion (A2) having a volume average particle diameter of 210 nm and a solid content of 30% by mass.

[Amorphous Polyester Resin Dispersion (A2)]

Propylene oxide adduct of bisphenol A: 80 mol %

Ethylene oxide 2 mol adduct of bisphenol A: 20 mol %

Terephthalic acid: 60 mol %

Fumaric acid: 20 mol %

Dodecenyl succinic anhydride: 20 mol %

A 5 L flask equipped with a stirrer, a nitrogen introduction tube, a temperature sensor, and a rectifying column is charged with the above monomer components, and the mixture is heated to 190° C. over 1 hour. After the mixture in the reaction system has been stirred evenly, dibutyl tin oxide is added in an amount of 1.2 parts with respect to 100 parts of the monomer components. While water generated is removed by evaporation, the mixture is heated from 190° C. to 240° C. over 6 hours, and the dehydration condensation reaction is continued at 240° C. for 2 hours to thereby obtain an amorphous polyester resin (A2) having a glass transition temperature of 63° C., an acid value of 10.5 mgKOH/g, a weight average molecular weight of 17000, and a number average molecular weight of 4200.

Next, the obtained amorphous polyester resin (A2) is used to prepare a resin particle dispersion as follows.

Amorphous polyester resin (A2): 100 parts

Ethyl acetate: 50 parts

Ethyl acetate is placed in a 5 L separable flask, and the above resin component is gradually added thereto. The mixture is stirred using a three-one motor to completely dissolve the resin component to thereby obtain an oil phase. A total of 2 parts of a 10 mass % aqueous ammonia water solution is gradually added dropwise to the oil phase under stirring using a dropper, and 230 parts of ion exchanged water is gradually added dropwise at a rate of 10 mL/min to subject the mixture to phase inversion emulsification. Then the solvent is removed while the pressure is reduced using an evaporator to thereby obtain an amorphous polyester resin dispersion (A2). The volume average particle diameter of the amorphous polyester resin particles in the dispersion is 120 nm, and the solid concentration is 30% by mass.

[Coloring Agent Particle Dispersion (A1)]

Carbon black (REGAL 330 manufactured by Cabot Corporation): 50 parts

Anionic surfactant (NEWREX R manufactured by NOF CORPORATION): 2 parts

Ion exchanged water: 198 parts

The above components are mixed, pre-dispersed for 10 minutes using a homogenizer (ULTRA-TURRAX manufactured by IKA), and then subjected to dispersion treatment at a pressure of 245 MPa for 15 minutes using Ultimaizer (counter collision type wet pulverizer manufactured by Sugino Machine Limited) to thereby obtain a coloring agent particle dispersion (A1) having a solid content of 20.0% by mass and containing coloring agent particles having a volume average particle diameter of 354 nm.

[Coloring Agent Particle Dispersion (A2)]

Blue pigment (copper phthalocyanine, C.I. Pigment blue 15:3 manufactured by Dainichiseika Color & Chemicals Mfg. Co., Ltd.): 50 parts Ionic surfactant (Neogen RK, DAI-ICHI KOGYO SEIYAKU Co., Ltd.): 5 parts Ion exchanged water: 195 parts The above components are mixed, dispersed for 10 minutes using a homogenizer (ULTRA-TURRAX manufactured by IKA), and then subjected to dispersion treatment at a pressure of 245 MPa for 15 minutes using Ultimaizer (counter collision type wet pulverizer manufactured by Sugino Machine Limited) to thereby obtain a coloring agent particle dispersion (A2) having a solid content of 20.0% by mass and containing coloring agent particles having a volume average particle diameter of 462 nm.

[Coloring Agent Particle Dispersion (A3)]

Magenta pigment (C.I. Pigment Red 122): 80 parts

Anionic surfactant (Neogen SC manufactured by DAI-ICHI KOGYO SEIYAKU Co., Ltd.): 8 parts Ion exchanged water: 200 parts The above components are mixed, dissolved, and dispersed for 10 minutes using a homogenizer (ULTRA-TURRAX manufactured by IKA), and 28 kHz ultrasonic waves are applied for 10 minutes using an ultrasonic disperser to thereby obtain a coloring agent particle dispersion (A3) having a volume average particle diameter of 132 nm and a solid content of 29.0% by mass.

[Coloring Agent Particle Dispersion (A4)]

Yellow pigment (5GX03 manufactured by Clariant): 80 parts

Anionic surfactant (Neogen SC manufactured by DAI-ICHI KOGYO SEIYAKU Co., Ltd.): 8 parts Ion exchanged water: 200 parts The above components are mixed, dissolved, and dispersed for 10 minutes using a homogenizer (ULTRA-TURRAX T50 manufactured by IKA), and 28 kHz ultrasonic waves are applied for 20 minutes using an ultrasonic disperser to thereby obtain coloring agent particle dispersion (A4) having a volume average particle diameter of 108 nm and a solid content of 29.0% by mass.

[Release Agent Particle Dispersion (A2)]

Olefin wax (melting point: 88° C.):90 parts

Ionic surfactant (Neogen RK, DAI-ICHI KOGYO SEIYAKU Co., Ltd.): 1.8 parts

Ion exchanged water: 210 parts

The above components are mixed, heated to 100° C., dispersed using a homogenizer (ULTRA-TURRAX T50 manufactured by IKA), then heated to 110° C. using a pressure ejection-type Gaulin homogenizer, and then subjected to dispersion treatment for 1 hour to thereby obtain a release agent particle dispersion (A2) having a volume average particle diameter of 180 nm and a solid content of 30% by mass.

[Production of Black Toner Particles (A1)]

Amorphous polyester resin dispersion (A2): 166 parts
Crystalline polyester resin dispersion (A2): 50 parts
Coloring agent particle dispersion (A1): 25 parts
Release agent particle dispersion (A2): 40 parts The above components are mixed and dispersed in a stainless steel-made round flask using a homogenizer (ULTRA-TURRAX T50). Next, 0.20 parts of poly-aluminum chloride is added thereto, and the dispersion operation is continued using the ULTRA-TURRAX T50. Then the flask is heated to 48° C. in a heating oil bath under stirring. The mixture is held at 48° C. for 60 minutes, and another 60 parts of the amorphous polyester resin dispersion (A2) is gradually added thereto. A 0.5 mol/L aqueous sodium hydroxide solution is used to adjust the pH of the system to 8.0, and then the stainless steel flask is sealed. While the stirring is continued using a magnetic seal, the mixture is heated to 90° C. and held for 3 hours.

After completion of the reaction, the mixture is cooled, filtered, washed with ion exchanged water, and then subjected to sold-liquid separation using a Nutsche funnel. The resulting solids are re-dispersed in 1 L of ion exchanged water at 40° C., and the mixture is stirred and washed at 300 rpm for 15 minutes. This procedure is repeated another 5 times. When the pH of the filtrate has reached 7.5 and its electric conductivity has reached 7.0 μS/cm, the product is subjected to solid-liquid separation on a No. 5A paper filter using a Nutsche funnel. The product is vacuum-dried continuously for 12 hours to thereby obtain black toner particles (A1).

The particle diameters of the black toner particles (A1) are measured using Multisizer II. The volume average particle diameter D50 is found to be 6.4 μm, and the volume-based particle size distribution index GSDv is found to be 1.21.

[Production of Black Toner (A1)]

100 Parts of the black toner particles (A1), 0.8 parts of decylsilane-treated hydrophobic titania having an average particle diameter of 15 nm, and 1.3 parts of hydrophobic silica having an average particle diameter of 30 nm (NY50 manufactured by Nippon Aerosil Co., Ltd.) are mixed and stirred for 10 minutes at a peripheral speed of 32 m/s using a Henschel mixer. Then a mesh sieve with a mesh size of 45 μm is used to remove coarse particles, and a black toner (A1) is thereby obtained.

[Production of Developer (C1)]

Ferrite particles (volume average particle diameter: 50 μm, volume resistivity: $10^8$ Ωcm): 100 parts
Toluene: 14 parts
Perfluorooctyl ethyl acrylate/methyl methacrylate copolymer (copolymerization ratio 40/60, Mw: 50000): 1.6 parts
Carbon black (VXC-72 manufactured by Cabot Corporation): 0.12 parts
Crosslinked melamine resin particles (number average particle diameter: 0.3 μm): 0.3 parts The above components excluding the ferrite particles are mixed and dispersed for 10 minutes using a stirrer to prepare a coating forming solution. The coating forming solution and the ferrite particles are placed in a vacuum degassed-type kneader and stirred at 60° C. for 30 minutes, and toluene is removed under reduced pressure. A resin coating is thereby formed on the surface of the ferrite particles, and a carrier (A2) is thereby produced.

94 Parts of the carrier (A2) and 6 parts of the black toner (A1) are mixed, stirred at 40 rpm for 20 minutes using a V-blender, and sieved using a sieve having a mesh size of 177 μm to thereby produce a developer (C1).

[Production of Cyan Toner Particles (A2), Cyan Toner (A2), and Developer (C2)]

Cyan toner particles (A2) are obtained using the same procedure as in the production of the black toner particles (A1) except that 20 parts of the coloring agent particle dispersion (A2) is used instead to the coloring agent particle dispersion (A1) used to produce the black toner particles (A1). The volume average particle diameter D50 of the toner particles obtained is 7.2 μm, and the volume-based particle size distribution index is 1.19.

A cyan toner (A2) is obtained using the same procedure as that for the black toner (A1) except that the cyan toner particles (A2) are used instead of the black toner particles (A1).

A developer (C2) is obtained using the same procedure as that for the developer (C1) except that the cyan toner (A2) is used instead of the black toner (A1).

[Production of Magenta Toner Particles (A3), Magenta Toner (A3), and Developer (C3)]

Magenta toner particles (A3) are obtained using the same procedure as in the production of the black toner particles (A1) except that 25 parts of the coloring agent particle dispersion (A3) is used instead of the coloring agent particle dispersion (A1) used for the production of the black toner particles (A1). The volume average particle diameter D50 of the toner particles obtained is 6. 8 μm, and the volume-based particle size distribution index is 1.22.

A magenta toner (A3) is obtained using the same procedure as that for the black toner (A1) except that the magenta toner particles (A3) are used instead of the black toner particles (A1).

A developer (C3) is obtained using the same procedure as that for the developer (C1) except that the magenta toner (A3) is used instead of the black toner (A1).

[Production of Yellow Toner Particles (A4), Yellow Toner (A4), and Developer (C4)]

Yellow toner particles (A4) are obtained using the same procedure as in the production of the black toner particles (A1) except that 25 parts of the coloring agent particle dispersion (A4) is used instead of the coloring agent particle dispersion (A1) used for the production of the black toner particles (A1). The volume average particle diameter D50 of the toner particles obtained is 7.4 μm, and the volume-based particle size distribution index is 1.19.

A yellow toner (A4) is obtained using the same procedure as that for the black toner (A1) except that the yellow toner particles (A4) are used instead of the black toner particles (A1).

A developer (C4) is obtained using the same procedure as that for the developer (C1) except that the yellow toner (A4) is used instead of the black toner (A1).

<Production of Pressure-Bonded Printed Materials>

[Press-Bonded Printed Material (A1)]

The developer (A1) containing the pressure phase transition particles is supplied to a developing unit of an apparatus obtained by modifying Color 1000 Press manufactured by Fuji Xerox Co., Ltd. The developers (C1) to (C4) containing the respective black, cyan, magenta, and yellow image portion-forming toners have been charged into the apparatus.

Recording paper sheets (OK Prince High grade manufactured by Oji Paper Co., Ltd.) used as recording mediums are placed in the apparatus. An image portion and a pressure phase transition layer are formed on both sides of the recording paper sheets to form pressure-bonding surfaces such that the resulting recording paper sheets can be used to produce printed materials (pressure-bonded postcards) by Z-folding the recording paper sheets and pressure-bonding the folded recording paper sheets as follows.

An electrophotographic image forming apparatus is used. Specifically, the developer (A1) containing the pressure phase transition particles is placed in a developing unit used for the pressure phase transition layer positioned on the uppermost surface of the image, and the developers (C1) to (C4) are placed in respective color developing units. This electrophotographic image forming apparatus is used to output the image portion and the pressure phase transition layer simultaneously. The pressure phase transition layer is outputted onto the pressure-bonding surfaces of a postcard to be pressure-bonded, and only the image portion-forming tonners are outputted onto portions used as the front side and the back side of the postcard.

The thickness of the pressure phase transition layer formed on the image portion is adjusted such that the relation between the thickness of the pressure phase transition layer and the thickness of the image portion satisfies formula 1 using the values of X1 and Y1 shown in Tables 1-1 and 1-2.

Next, the recording paper sheet is Z-folded and pressure-bonded using an apparatus obtained by modifying a pressure-bonding sealer PRESSELE LEADA (manufactured by TOPPAN FORMS CO., LTD.). In this case, the surface of the recording paper sheet on which the image portion and the pressure phase transition layer have been formed is used as a pressure-bonding surface. A pressure-bonded printed material (A1) is thereby produced.

[Press-Bonded Printed Materials (A2) to (A19)]

Press-bonded printed materials (A2) to (A19) and (A27)-(A28) are produced using the same procedure as that for the pressure-bonded printed material (A1) except that conditions shown in Tables 1-1 and 1-2 are used.

<Evaluation>

The difference between the pressure-bonding strength between the pressure-bonded surfaces on the front side of the Z-folded pressure-bonded printed material and the pressure-bonding strength between the pressure-bonded surfaces on the back side is evaluated as follows.

Very good: The pressure difference is less than 0.5, and no peeling occurs.

Not good: The pressure difference is 0.5 or more, and peeling occurs.

TABLE 1-1

| | | Z-folded pressure-bonded printed material | | | | | |
|---|---|---|---|---|---|---|---|
| | | Front side | | | | | |
| | | Image portion | Pressure phase transition layer | | | | |
| | Type | Average thickness B (μm) | Thickness A on image portion (μm) | Coverage (%) | Thickness on non-image portion (μm) | Coverage (%) | Formula (2) X1 value |
| Example 1 | A1 | 2.2 | 2.0 | 76 | 0.5 | 35 | 0.7 |
| Example 2 | A2 | 3 | 2.5 | 90 | 1 | 70 | 0.5 |
| Example 3 | A3 | 1.6 | 2.3 | 88 | 0.8 | 56 | 0.9 |
| Example 4 | A4 | 3 | 2.3 | 88 | 0.8 | 56 | 0.5 |
| Example 5 | A5 | 3 | 2.3 | 88 | 0.8 | 56 | 0.5 |
| Example 6 | A6 | 4 | 2.3 | 88 | 0.8 | 56 | 0.4 |
| Example 7 | A7 | 2.5 | 1.5 | 60 | 0.5 | 35 | 0.4 |
| Example 8 | A8 | 0.1 | 1.1 | 50 | 0.5 | 35 | 6 |
| Example 9 | A9 | 0.1 | 1.6 | 72 | 1 | 70 | 6 |
| Example 10 | A10 | 0.1 | 2.6 | 85 | 2 | 88 | 6 |
| Example 11 | A11 | 0.1 | 1.3 | 59 | 0.8 | 56 | 5 |
| Example 12 | A12 | 0.5 | 2.1 | 75 | 0.8 | 56 | 3 |
| Example 13 | A13 | 2 | 2.5 | 70 | 0.8 | 56 | 2 |
| Example 14 | A14 | 0.4 | 2.5 | 80 | 0.7 | 49 | 5 |
| Example 15 | A15 | 0.2 | 1.4 | 63 | 0.6 | 42 | 4 |
| Example 16 | A16 | 0.2 | 1.8 | 78 | 0.6 | 42 | 6 |
| Example 17 | A17 | 0.2 | 2.6 | 83 | 0.6 | 42 | 10 |
| Example 18 | A18 | 0.2 | 1.6 | 83 | 0.4 | 28 | 6 |
| Example 19 | A19 | 0.1 | 3.0 | 90 | 1.5 | 70 | 10 |
| Comparative Example 1 | A27 | 0.4 | 2.0 | 95 | 2.2 | 85 | 5 |
| Comparative Example 2 | A28 | 0.3 | 2.2 | 98 | 2.5 | 95 | 11 |

TABLE 1-1-continued

| | Z-folded pressure-bonded printed material Front side | | | | |
|---|---|---|---|---|---|
| | Formula (3) Y1 value | Pressure-bonding strength (N) | Pressure-bonding strength width (N) Divided into 5 sections Δmaximum − minimum | Pressure-bonding strength width (N) Judgment | Judgment Acceptable: curl Not good: breakage |
| Example 1 | 0.5 | 0.38 | 0.15 | Very good | Very good |
| Example 2 | 1 | 0.35 | 0.15 | Very good | Very good |
| Example 3 | 0.8 | 0.40 | 0.2 | Very good | Very good |
| Example 4 | 0.8 | 0.32 | 0.25 | Very good | Very good |
| Example 5 | 0.8 | 0.33 | 0.2 | Very good | Very good |
| Example 6 | 0.8 | 0.30 | 0.25 | Very good | Very good |
| Example 7 | 0.5 | 0.30 | 0.3 | Very good | Very good |
| Example 8 | 0.5 | 0.40 | 0.2 | Very good | Very good |
| Example 9 | 1 | 0.70 | 0.2 | Very good | Very good |
| Example 10 | 2 | 0.80 | 0.2 | Very good | Acceptable |
| Example 11 | 0.8 | 0.60 | 0.12 | Very good | Very good |
| Example 12 | 0.8 | 0.50 | 0.25 | Very good | Acceptable |
| Example 13 | 0.8 | 0.30 | 0.3 | Very good | Very good |
| Example 14 | 0.7 | 0.70 | 0.25 | Very good | Very good |
| Example 15 | 0.6 | 0.60 | 0.2 | Very good | Very good |
| Example 16 | 0.6 | 0.70 | 0.3 | Very good | Very good |
| Example 17 | 0.6 | 0.80 | 0.35 | Very good | Acceptable |
| Example 18 | 0.4 | 0.35 | 0.4 | Acceptable | Very good |
| Example 19 | 2 | 1.35 | 0.4 | Acceptable | Acceptable |
| Comparative Example 1 | 3 | Sheet breakage | — | Not good | Not good |
| Comparative Example 2 | 2.5 | Sheet breakage | — | Not good | Not good |

TABLE 1-2

| | Z-folded pressure-bonded printed material Back side | | | | | | |
|---|---|---|---|---|---|---|---|
| | Image portion | Pressure phase transition layer | | | | Pressure- | Pressure-bonding strength width (N) Divided into |
| | Average thickness B (μm) | Thickness A on image portion (μm) | Coverage (%) | Thickness on non-image portion (μm) | Coverage (%) | bonding strength (N) | 5 sections Δmaximum − minimum |
| Example 1 | 2.5 | 2.0 | 80 | 0.5 | 35 | 0.32 | 0.2 |
| Example 2 | 2.5 | 3.0 | 92 | 0.5 | 35 | 0.40 | 0.2 |
| Example 3 | 2 | 1.5 | 60 | 0.7 | 49 | 0.35 | 0.3 |
| Example 4 | 2 | 1.9 | 76 | 0.7 | 49 | 0.45 | 0.3 |
| Example 5 | 2 | 2.7 | 90 | 0.7 | 49 | 0.50 | 0.32 |
| Example 6 | 2 | 1.4 | 56 | 0.4 | 28 | 0.20 | Small |
| Example 7 | 1.8 | 3.8 | 88 | 2 | 95 | 0.60 | 0.56 |
| Example 8 | 0.2 | 2.3 | 79 | 0.8 | 56 | 0.60 | 0.2 |
| Example 9 | 0.4 | 2.5 | 80 | 0.7 | 49 | 0.70 | 0.25 |
| Example 10 | 0.2 | 1.0 | 45 | 0.6 | 42 | 0.30 | 0.2 |
| Example 11 | 0.2 | 1.8 | 78 | 0.6 | 42 | 0.70 | 0.3 |
| Example 12 | 0.2 | 2.6 | 83 | 0.6 | 42 | 0.80 | 0.35 |
| Example 13 | 0.2 | 1.6 | 83 | 0.4 | 28 | 0.35 | 0.4 |
| Example 14 | 2.5 | 3.0 | 92 | 0.5 | 35 | 0.40 | 0.2 |
| Example 15 | 2 | 1.5 | 60 | 0.7 | 49 | 0.35 | 0.3 |
| Example 16 | 2 | 1.9 | 76 | 0.7 | 49 | 0.45 | 0.3 |
| Example 17 | 2 | 2.7 | 90 | 0.7 | 49 | 0.50 | 0.32 |
| Example 18 | 2 | 1.4 | 56 | 0.4 | 28 | 0.25 | Small |
| Example 19 | 1.8 | 3.8 | 88 | 2 | 95 | 0.80 | 0.5 |
| Comparative Example 1 | 2.3 | 2.2 | 90 | 2.3 | 95 | Sheet breakage | — |
| Comparative Example 2 | 2.5 | 2.3 | 90 | 2.6 | 95 | Sheet breakage | — |

TABLE 1-2-continued

| | Z-folded pressure-bonded printed material Back side | | Evaluation of Z-folded printed material | |
|---|---|---|---|---|
| | Pressure-bonding strength width (N) Judgment | Judgment Acceptable: curl Not good: breakage | Pressure-bonding strength difference | Judgment |
| Example 1 | Very good | Very good | 0.06 | Very good |
| Example 2 | Very good | Very good | −0.05 | Very good |
| Example 3 | Very good | Very good | 0.05 | Very good |
| Example 4 | Very good | Very good | −0.13 | Very good |
| Example 5 | Very good | Very good | −0.17 | Very good |
| Example 6 | Very good | Very good | 0.1 | Very good |
| Example 7 | Acceptable | Very good | −0.3 | Very good |
| Example 8 | Very good | Very good | −0.2 | Very good |
| Example 9 | Very good | Very good | 0 | Very good |
| Example 10 | Very good | Very good | 0.5 | Not good |
| Example 11 | Very good | Very good | −0.1 | Very good |
| Example 12 | Very good | Acceptable | −0.3 | Very good |
| Example 13 | Acceptable | Very good | −0.05 | Very good |
| Example 14 | Very good | Very good | 0.3 | Very good |
| Example 15 | Very good | Very good | 0.25 | Very good |
| Example 16 | Very good | Very good | 0.25 | Very good |
| Example 17 | Very good | Very good | 0.3 | Very good |
| Example 18 | Very good | Very good | 0.1 | Very good |
| Example 19 | Acceptable | Very good | 0.55 | Not good |
| Comparative Example 1 | Not good | Not good | — | Not good |
| Comparative Example 2 | Not good | Not good | — | Not good |

As can be seen from the above results, in each of the Examples, the difference between the pressure-bonding strength between the pressure-bonded surfaces on the front side of the Z-folded pressure-bonded printed material and the pressure-bonding strength between the pressure-bonded surfaces on the back side is smaller than that in the Comparative Examples, and the unevenness in the pressure-bonding strength between the pressure-bonded surfaces is small.

Example B

<Preparation of Dispersions Containing Styrene-Based Resin Particles>

[Preparation of Styrene-Based Resin Particle Dispersion (St1)]

Styrene: 390 parts
n-Butyl acrylate: 100 parts
Acrylic acid: 10 parts
Dodecanethiol: 7.5 parts The above components are mixed and dissolved to prepare a monomer solution.

8 Parts of an anionic surfactant (DOWFAX 2A1 manufactured by Dow Chemical Company) is dissolved in 205 parts of ion exchanged water, and the monomer solution is added thereto, dispersed, and then emulsified to thereby obtain an emulsion.

2.2 Parts of an anionic surfactant (DOWFAX 2A1 manufactured by Dow Chemical Company) is dissolved in 462 parts of ion exchanged water, and the mixture is placed in a polymerization flask equipped with a stirrer, a thermometer, a reflux condenser tube, and a nitrogen gas introduction tube, heated to 73° C. under stirring, and held at 73° C.

3 Parts of ammonium persulfate is dissolved in 21 parts of ion exchanged water. The resulting mixture is added dropwise to the polymerization flask over 15 minutes using a metering pump, and the emulsion is added dropwise to the polymerization flask over 160 minutes using a metering pump.

Then the polymerization flask is held at 75° C. for 3 hours under gentle stirring and then returned to room temperature (25° C.)

A styrene-based resin particle dispersion (St1) containing styrene-based resin particles is thereby obtained. The resin particles have a volume average particle diameter (D50v) of 174 nm, and the styrene-based resin has a weight average molecular weight of 49000 as determined by GPC (UV detection) and a glass transition temperature of 54° C. The solid content of the styrene-based resin particle dispersion (St1) is 42% by mass.

The styrene-based resin particle dispersion (St1) is dried to obtain the styrene-based resin particles. The thermal behavior of the styrene-based resin particles is analyzed in the temperature range of −100° C. to 100° C. using a differential scanning calorimeter (DSC-60A manufactured by Shimadzu Corporation), and one glass transition temperature is observed. The glass transition temperature is shown in Table 2.

[Preparation of Styrene-Based Resin Particle Dispersions (St2) to (St13)]

Styrene-based resin particle dispersions (St2) to (St13) are prepared using the same procedure as in the preparation of the styrene-based resin particle dispersion (St1) except that the monomers are changed as shown in Table 2.

In Table 2, the monomers are denoted by the following abbreviations.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA

TABLE 2

| Styrene-based resin particle dispersion | | | | | | | | | | | |
|---|---|---|---|---|---|---|---|---|---|---|---|
| | Polymerization components (mass ratio) | | | | | | | | D50v of resin particles | Mw (k) | Tg |
| No. | St | BA | 2EHA | EA | 4HBA | AA | MAA | CEA | nm | — | ° C. |
| St1 | 78 | 20 | 0 | 0 | 0 | 2 | 0 | 0 | 174 | 49 | 54 |
| St2 | 88 | 10 | 0 | 0 | 0 | 2 | 0 | 0 | 170 | 50 | 76 |
| St3 | 83 | 15 | 0 | 0 | 0 | 2 | 0 | 0 | 172 | 52 | 65 |
| St4 | 78 | 20 | 0 | 0 | 0 | 0 | 2 | 0 | 177 | 48 | 57 |
| St5 | 80 | 15 | 0 | 0 | 5 | 0 | 0 | 0 | 172 | 46 | 55 |
| St6 | 80 | 15 | 5 | 0 | 0 | 0 | 0 | 0 | 174 | 51 | 54 |
| St7 | 80 | 20 | 0 | 0 | 0 | 0 | 0 | 0 | 169 | 50 | 54 |
| St8 | 77 | 20 | 0 | 0 | 0 | 0 | 0 | 3 | 168 | 48 | 54 |
| St9 | 72 | 26 | 0 | 0 | 0 | 2 | 0 | 0 | 172 | 55 | 43 |
| St10 | 68 | 30 | 0 | 0 | 0 | 2 | 0 | 0 | 173 | 53 | 35 |
| St11 | 80 | 0 | 20 | 0 | 0 | 0 | 0 | 0 | 171 | 52 | 56 |
| St12 | 78 | 0 | 20 | 0 | 0 | 2 | 0 | 0 | 167 | 49 | 56 |
| St13 | 63 | 0 | 0 | 35 | 0 | 2 | 0 | 0 | 169 | 51 | 54 |

<Preparation of Dispersions Containing Composite Resin Particles>

[Preparation of Composite Resin Particle Dispersion (M1)]

Styrene-based resin particle dispersion (St1): 1190 parts (solid content: 500 parts)

2-Ethylhexyl acrylate: 250 parts n-Butyl acrylate: 250 parts

Ion exchanged water: 982 parts

The above materials are charged into a polymerization flask, stirred at 25° C. for 1 hour, and heated to 70° C.

2.5 Parts of ammonium persulfate is dissolved in 75 parts of ion exchanged water, and the mixture is added dropwise to the polymerization flask over 60 minutes using a metering pump.

Then the polymerization flask is held at 70° C. for 3 hours under gentle stirring and returned to room temperature (25° C.)

A composite resin particle dispersion (M1) containing composite resin particles is thereby obtained. The resin particles have a volume average particle diameter (D50v) of 219 nm, and the composite resin has a weight average molecular weight of 219000 as determined by GPC (UV detection). The solid content of the composite resin particle dispersion (M1) is 32% by mass.

The composite resin particle dispersion (M1) is dried to obtain the composite resin particles. The thermal behavior of the composite resin particles is analyzed in the temperature range of −150° C. to 100° C. using a differential scanning calorimeter (DSC-60A manufactured by Shimadzu Corporation), and two glass transition temperatures are observed. The glass transition temperatures are shown in Table 3.

[Preparation of Composite Resin Particle Dispersions (M2) to (M21)]

Composite resin particle dispersions (M2) to (M21) are produced using the same procedure as in the preparation of the composite resin particle dispersion (M1) except that the styrene-based resin particle dispersion (St1) is changed as shown in Table 3 or the polymerization components of the (meth)acrylate-based resin are changed as shown in Table 3.

[Preparation of Composite Resin Particle Dispersions (M22) to (M27)]

Composite resin particle dispersions (M22) to (M27) are prepared using the same procedure as in the preparation of the composite resin particle dispersion (M1) except that the amount of 2-ethylhexyl acrylate used and the amount of n-butyl acrylate used are adjusted.

In Table 3, the monomers are denoted by the following abbreviations.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA

TABLE 3

| Composite resin particle dispersion | | | | | | | | | |
|---|---|---|---|---|---|---|---|---|---|
| | St-based resin | | | | Composite resin particles (or comparative resin particles) | | | | |
| | St-based resin particle | Polymerization | Tg | Ac-based resin Polymerization | Mass ratio of St-based resin to Ac-based resin | D50v of resin particles | Mw (k) | Tg | |
| No. | dispersion | components | ° C. | components | (St:Ac) | nm | — | ° C. | ° C. |
| M1 | St1 | St/BA/AA = 78/20/2 | 54 | 2EHA/BA = 50/50 | 50:50 | 219 | 219 | −52 | 54 |
| M2 | St2 | St/BA/AA = 88/10/2 | 76 | 2EHA/BA = 50/50 | 50:50 | 218 | 240 | −52 | 76 |
| M3 | St3 | St/BA/AA = 83/15/2 | 65 | 2EHA/BA = 50/50 | 50:50 | 220 | 231 | −52 | 65 |
| M4 | St4 | St/BA/MAA = 78/20/2 | 57 | 2EHA/BA = 50/50 | 50:50 | 221 | 250 | −52 | 57 |
| M5 | St5 | St/BA/4HBA = 80/15/5 | 55 | 2EHA/BA = 50/50 | 50:50 | 224 | 242 | −52 | 55 |
| M6 | St6 | St/BA/2EHA = 80/15/5 | 54 | 2EHA/BA = 50/50 | 50:50 | 225 | 233 | −52 | 54 |

TABLE 3-continued

| | | | | | Composite resin particle dispersion | | | | |
|---|---|---|---|---|---|---|---|---|---|
| | St-based resin | | | | Composite resin particles (or comparative resin particles) | | | | |
| No. | St-based resin particle dispersion | Polymerization components | Tg ° C. | Ac-based resin Polymerization components | Mass ratio of St-based resin to Ac-based resin (St:Ac) | D50v of resin particles nm | Mw (k) — | Tg ° C. | Tg ° C. |
| M7 | St7 | St/BA = 80/20 | 54 | 2EHA/BA = 50/50 | 50:50 | 224 | 243 | −52 | 54 |
| M8 | St8 | St/BA/CEA = 77/20/3 | 54 | 2EHA/BA = 50/50 | 50:50 | 222 | 260 | −52 | 54 |
| M9 | St9 | St/BA/AA = 72/26/2 | 43 | 2EHA/BA = 50/50 | 50:50 | 223 | 251 | −52 | 43 |
| M10 | St10 | St/BA/AA = 68/30/2 | 35 | 2EHA/BA = 50/50 | 50:50 | 220 | 243 | −52 | 35 |
| M11 | St11 | St/2EHA = 80/20 | 56 | 2EHA/BA = 50/50 | 50:50 | 221 | 249 | −52 | 56 |
| M12 | St12 | St/2EHA/AA = 78/20/2 | 56 | 2EHA/BA = 50/50 | 50:50 | 227 | 237 | −52 | 56 |
| M13 | St12 | St/2EHA/AA = 78/20/2 | 56 | 2EHA/HA = 50/50 | 50:50 | 224 | 226 | −55 | 56 |
| M14 | St13 | St/EA/AA = 63/35/2 | 54 | 2EHA/PA = 50/50 | 50:50 | 224 | 243 | −45 | 54 |
| M15 | St1 | St/BA/AA = 78/20/2 | 54 | 2EHA/HA = 50/50 | 50:50 | 226 | 270 | −54 | 54 |
| M16 | St1 | St/BA/AA = 78/20/2 | 54 | 2EHA/BA = 90/10 | 50:50 | 224 | 264 | −51 | 54 |
| M17 | St1 | St/BA/AA = 78/20/2 | 54 | 2EHA/BA = 80/20 | 50:50 | 226 | 248 | −52 | 54 |
| M18 | St1 | St/BA/AA = 78/20/2 | 54 | 2EHA/BA = 70/30 | 50:50 | 226 | 260 | −52 | 54 |
| M19 | St1 | St/BA/AA = 78/20/2 | 54 | 2EHA/BA = 30/70 | 50:50 | 225 | 273 | −52 | 54 |
| M20 | St1 | St/BA/AA = 78/20/2 | 54 | 2EHA/BA = 20/80 | 50:50 | 224 | 233 | −52 | 54 |
| M21 | St1 | St/BA/AA = 78/20/2 | 54 | 2EHA/BA = 10/90 | 50:50 | 223 | 243 | −53 | 54 |
| M22 | St1 | St/BA/AA = 78/20/2 | 54 | 2EHA/BA = 50/50 | 90:10 | 182 | 180 | −52 | 54 |
| M23 | St1 | St/BA/AA = 78/20/2 | 54 | 2EHA/BA = 50/50 | 80:20 | 190 | 210 | −52 | 54 |
| M24 | St1 | St/BA/AA = 78/20/2 | 54 | 2EHA/BA = 50/50 | 70:30 | 199 | 223 | −52 | 54 |
| M25 | St1 | St/BA/AA = 78/20/2 | 54 | 2EHA/BA = 50/50 | 30:70 | 259 | 300 | −52 | 54 |
| M26 | St1 | St/BA/AA = 78/20/2 | 54 | 2EHA/BA = 50/50 | 20:80 | 300 | 320 | −52 | 54 |
| M27 | St1 | St/BA/AA = 78/20/2 | 54 | 2EHA/BA = 50/50 | 10:90 | 380 | 331 | −52 | 54 |

<Preparation of Pressure Phase Transition Particles>

[Preparation of Pressure Phase Transition Particles (1) and Developer (1)]

Composite resin particle dispersion (M1): 504 parts

Ion exchanged water: 710 parts

Anionic surfactant (DOWFAX 2A1 manufactured by Dow Chemical Company): 1 part

The above materials are placed in a reaction vessel equipped with a thermometer and a pH meter, and a 1.0 mass % aqueous nitric acid solution is added at a temperature of 25° C. to adjust the pH to 3.0. Then, while the mixture is dispersed at a rotation speed of 5,000 rpm using a homogenizer (ULTRA-TURRAX T50 manufactured by IKA Japan), 23 parts of a 2.0 mass % aqueous aluminum sulfate solution is added. Next, a heating mantle is attached to the reaction vessel. The temperature of the mixture is increased at a heating rate of 0.2° C./minute until the temperature reaches 40° C. and then at a heating rate of 0.05° C./minute after the temperature has exceeded 40° C., and the particle diameters are measured at 10 minute intervals using Coulter Multisizer II (manufactured by Coulter, aperture diameter: 50 μm). When the volume average particle diameter has reached 5.0 μm, the temperature is held constant, and 170 parts of the styrene-based resin particle dispersion (St1) is added over 5 minutes. After completion of the addition, the slurry is held at 50° C. for 30 minutes, and a 1.0 mass % aqueous sodium hydroxide solution is used to adjust the pH of the slurry to 6.0. Then the temperature is increased to 90° C. at a heating rate of 1° C./minute while the pH is adjusted to 6.0 at 5° C. intervals, and the slurry is held at 90° C. An optical microscope and a field emission transmission electron microscope (FE-SEM) are used to observe the shapes of the particles and their surface properties. Coalescence of the particles is found after a lapse of 10 hours, and then the container is cooled using cooling water to 30° C. over 5 minutes.

The cooled slurry is allowed to pass through a nylon mesh with a mesh size of 15 μm to remove coarse particles, and the slurry passing through the mesh is filtered using an aspirator under reduced pressure. The solids remaining on the paper filter are pulverized by hand as finely as possible and added to ion exchanged water (temperature: 30° C.). The amount of the ion exchanged water is 10 times the amount of the solids. Then the mixture is stirred for 30 minutes. Next, the mixture is filtered using an aspirator under reduced pressure, and the solids remaining on the paper filer are pulverized by hand as finely as possible and added to ion exchanged water (temperature: 30° C.). The amount of the ion exchanged water is 10 times the amount of the solids. Then the mixture is stirred for 30 minutes and again filtered using an aspirator under reduced pressure, and the electric conductivity of the filtrate is measured. This procedure is repeated until the electric conductivity of the filtrate becomes 10 μS/cm to wash the solids.

The washed solids are finely pulverized using a wet and dry granulator (Comil) and vacuum-dried in an oven at 25° C. for 36 hours to thereby obtain base particles (1). The base particles (1) have a volume average particle diameter of 8.0 μm.

100 Parts of the base particles (1) and 1.5 parts of hydrophobic silica (RY50 manufactured by Nippon Aerosil Co., Ltd.) are mixed, and the mixture is stirred at a rotation speed of 13000 rpm for 30 seconds using a sample mill. Then the mixture is sieved using a vibrating sieve with a mesh size of 45 μm to obtain pressure phase transition particles (1).

The pressure phase transition particles (1) are used as a sample, and their thermal behavior is analyzed in the temperature range of −150° C. to 100° C. using a differential scanning calorimeter (DSC-60A manufactured by Shimadzu Corporation). The sample observed has two glass transition temperatures. The glass transition temperatures are shown in Table 4.

The temperatures T1 and T2 of the pressure phase transition particles (1) are determined using the measurement method described above, and the pressure phase transition particles (1) are found to satisfy formula 1 "10° C.≤T1−T2."

A cross section of the pressure phase transition particles (A) is observed under a scanning electron microscope (SEM), and the sea-island structure is found. The pressure phase transition particles (1) each have a core portion including the island phase and a shell layer including no island phase. The sea phase contains the styrene-based resin, and the island phase contains the (meth)acrylate-based resin. The average diameter of the island phase is determined using the above-described measurement method. The average diameter of the island phase is shown in Table 4.

10 Parts of the pressure phase transition particles (1) and 100 parts of a resin-coated carrier described below are placed in a V blender, stirred for 20 minutes, and sieved using a vibrating sieve with a mesh size of 212 μm to thereby obtain a developer (1).

Mn—Mg—Sr-based ferrite particles (average particle diameter: 40 μm):100 parts

Toluene: 14 parts

Polymethyl methacrylate: 2 parts

Carbon black (VXC72 manufactured by Cabot Corporation): 0.12 parts

The above materials excluding the ferrite particles and glass beads (diameter: 1 mm, the same amount as the amount of toluene) are mixed and stirred at a rotation speed of 1200 rpm for 30 minutes using a sand mill manufactured by Kansai Paint Co., Ltd. to obtain a dispersion. The dispersion and the ferrite particles are placed in a vacuum degassed-type kneader and dried under reduced pressure while stirred to thereby obtain a resin-coated carrier.

[Preparation of Pressure Phase Transition Particles (2) to (27) and Developers (2) to (27)]

Pressure-phase transition particles (2) to (27) and developers (2) to (27) are prepared using the same procedure as in the preparation of the pressure phase transition particles (1) except that the composite resin particle dispersion and the styrene-based resin particle dispersion are changed as shown in Table 4.

The temperatures T1 and T2 of the pressure phase transition particles (2) to (27) are determined using the measurement method described above. All the pressure phase transition particles (2) to (27) satisfy formula 1 "10° C.≤T1−T2."

[Evaluation of Pressure-Responsive Phase Transition]

The temperature difference (T1−T3) that is the index indicating the susceptibility of particles to undergo the pressure-induced phase transition is determined. One type of particles is used as a sample, and the temperatures T1 and T3 are measured using a flow tester (CFT-500 manufactured by Shimadzu Corporation). Then the temperature difference (T1−T3) is computed. The temperature difference (T1−T3) is shown in Table 4.

[Evaluation of Pressure-Bonding Strength]

The apparatus shown in FIG. 3 is prepared as a printed material production apparatus. Specifically, the printed material production apparatus prepared includes: the quintuple tandem printing means of the intermediate transfer type that performs the formation of an image portion on a recording medium and then the placement of pressure phase transition particles; and the pressure-bonding means including the folding device and the pressurizing device.

Pressure phase transition particles (or comparative particles), a yellow toner, a magenta toner, a cyan toner, and a black toner are charged into the respective five developing units included in the printing means. The yellow toner, the magenta toner, the cyan toner, and the black toner are commercial products manufactured by Fuji Xerox Co., Ltd.

Postcard sheets V424 manufactured by Fuji Xerox Co., Ltd. are prepared as recording mediums.

The image portion to be formed on the postcard sheets is an image including black letters and a full color photograph image and having an area density of 30% and is to be formed on one side of the postcard sheets.

The amount of the pressure phase transition particles (or the comparative particles) to be placed on the image portion formation region on the image portion formation surface of each postcard sheet is 3 $g/m^2$.

The folding device folds a postcard sheet in half such that the image portion formation surface is on the inner side.

The pressure of the pressurizing device is 90 MPa.

A postcard is folded in half using the above apparatus under the above conditions such that the image portion formation surfaces of panels of the folded postcard are on the inner side and fixed to each other. Then a total of 10 postcards are produced continuously.

The tenth postcard is cut in its long side direction to produce a rectangular test piece with a width of 15 mm, and a 90 degree peel test is performed. The peeling rate in the 90 degree peel test is 20 mm/minute. The load (N) is measured when the tensile distance of the sample is in the range of 10 mm to 50 mm after the start of the measurement at 0.4 mm intervals, and the average of the measured values is computed. Then the average loads (N) of three test pieces are averaged. The load (N) required for peeling is rated as follows. The results are shown in Table 4.

A: 0.8 N or more

B: 0.6 N or more and less than 0.8 N

C: 0.4 N or more and less than 0.6 N

D: 0.2 N or more and less than 0.4 N

E: less than 0.2 N

TABLE 4

| | Core portion | | | | |
|---|---|---|---|---|---|
| Particles | Composite resin particle dispersion | Polymerization components of St-based resin | Polymerization components of Ac-based resin | Mass ratio of St-based resin to Ac-based resin (St:Ac) | Shell layer St-based resin particle dispersion |
| 1 | M1 | St/BA/AA = 78/20/2 | 2EHA/BA = 50/50 | 50:50 | St1 |
| 2 | M2 | St/BA/AA = 88/10/2 | 2EHA/BA = 50/50 | 50:50 | St2 |
| 3 | M3 | St/BA/AA = 83/15/2 | 2EHA/BA = 50/50 | 50:50 | St3 |
| 4 | M4 | St/BA/MAA = 78/20/2 | 2EHA/BA = 50/50 | 50:50 | St4 |
| 5 | M5 | St/BA/4HBA = 80/15/5 | 2EHA/BA = 50/50 | 50:50 | St5 |
| 6 | M6 | St/BA/2EHA = 80/15/5 | 2EHA/BA = 50/50 | 50:50 | St6 |

TABLE 4-continued

| | | | | | |
|---|---|---|---|---|---|
| 7 | M7 | St/BA = 80/20 | 2EHA/BA = 50/50 | 50:50 | St7 |
| 8 | M8 | St/BA/CEA = 77/20/3 | 2EHA/BA = 50/50 | 50:50 | St8 |
| 9 | M9 | St/BA/AA = 72/26/2 | 2EHA/BA = 50/50 | 50:50 | St9 |
| 10 | M10 | St/BA/AA = 68/30/2 | 2EHA/BA = 50/50 | 50:50 | St10 |
| 11 | M11 | St/2EHA = 80/20 | 2EHA/BA = 50/50 | 50:50 | St11 |
| 12 | M12 | St/2EHA/AA = 78/20/2 | 2EHA/BA = 50/50 | 50:50 | St12 |
| 13 | M13 | St/2EHA/AA = 78/20/2 | 2EHA/HA = 50/50 | 50:50 | St12 |
| 14 | M14 | St/EA/AA = 63/35/2 | 2EHA/PA = 50/50 | 50:50 | St13 |
| 15 | M15 | St/BA/AA = 78/20/2 | 2EHA/HA = 50/50 | 50:50 | St1 |
| 16 | M16 | St/BA/AA = 78/20/2 | 2EHA/BA = 90/10 | 50:50 | St1 |
| 17 | M17 | St/BA/AA = 78/20/2 | 2EHA/BA = 80/20 | 50:50 | St1 |
| 18 | M18 | St/BA/AA = 78/20/2 | 2EHA/BA = 70/30 | 50:50 | St1 |
| 19 | M19 | St/BA/AA = 78/20/2 | 2EHA/BA = 30/70 | 50:50 | St1 |
| 20 | M20 | St/BA/AA = 78/20/2 | 2EHA/BA = 20/80 | 50:50 | St1 |
| 21 | M21 | St/BA/AA = 78/20/2 | 2EHA/BA = 10/90 | 50:50 | St1 |
| 22 | M22 | St/BA/AA = 78/20/2 | 2EHA/BA = 50/50 | 90:10 | St1 |
| 23 | M23 | St/BA/AA = 78/20/2 | 2EHA/BA = 50/50 | 80:20 | St1 |
| 24 | M24 | St/BA/AA = 78/20/2 | 2EHA/BA = 50/50 | 70:30 | St1 |
| 25 | M25 | St/BA/AA = 78/20/2 | 2EHA/BA = 50/50 | 30:70 | St1 |
| 26 | M26 | St/BA/AA = 78/20/2 | 2EHA/BA = 50/50 | 20:80 | St1 |
| 27 | M27 | St/BA/AA = 78/20/2 | 2EHA/BA = 50/50 | 10:90 | St1 |

| | Particles | | | | | | | |
|---|---|---|---|---|---|---|---|---|
| | D50v | Average diameter of island phase | Tg | | Tg difference | T3 | Pressure-responsive phase transition (T1-T3) | Bonding |
| Particles | μm | nm | ° C. | ° C. | ° C. | ° C. | ° C. | strength |
| 1 | 8.0 | 200 | −52 | 54 | 106 | 75 | 15 | A |
| 2 | 11.0 | 250 | −52 | 76 | 128 | 70 | 13 | A |
| 3 | 11.0 | 280 | −52 | 65 | 117 | 78 | 15 | A |
| 4 | 11.0 | 240 | −52 | 57 | 109 | 70 | 10 | A |
| 5 | 11.0 | 240 | −52 | 55 | 107 | 74 | 16 | A |
| 6 | 11.0 | 250 | −52 | 54 | 106 | 73 | 14 | A |
| 7 | 9.5 | 250 | −52 | 54 | 106 | 73 | 13 | A |
| 8 | 9.5 | 250 | −52 | 54 | 106 | 75 | 10 | A |
| 9 | 9.5 | 220 | −52 | 43 | 95 | 75 | 15 | A |
| 10 | 9.5 | 230 | −52 | 35 | 87 | 73 | 15 | A |
| 11 | 9.5 | 220 | −52 | 56 | 108 | 72 | 15 | A |
| 12 | 9.5 | 230 | −52 | 56 | 108 | 75 | 20 | A |
| 13 | 5.8 | 250 | −55 | 56 | 111 | 70 | 15 | A |
| 14 | 5.8 | 350 | −45 | 54 | 99 | 80 | 5 | B |
| 15 | 5.8 | 400 | −54 | 54 | 108 | 81 | 7 | B |
| 16 | 8.0 | 400 | −51 | 54 | 105 | 80 | 10 | B |
| 17 | 8.0 | 300 | −52 | 54 | 106 | 70 | 20 | A |
| 18 | 8.0 | 250 | −52 | 54 | 106 | 75 | 15 | A |
| 19 | 8.0 | 250 | −52 | 54 | 106 | 73 | 15 | A |
| 20 | 8.0 | 300 | −52 | 54 | 106 | 75 | 20 | A |
| 21 | 8.0 | 400 | −53 | 54 | 107 | 80 | 9 | B |
| 22 | 8.0 | 450 | −52 | 54 | 106 | 85 | 5 | C |
| 23 | 8.0 | 400 | −52 | 54 | 106 | 80 | 10 | B |
| 24 | 8.0 | 250 | −52 | 54 | 106 | 75 | 15 | A |
| 25 | 8.0 | 210 | −52 | 54 | 106 | 73 | 13 | A |
| 26 | 8.0 | 230 | −52 | 54 | 106 | 72 | 13 | A |
| 27 | 8.0 | 250 | −52 | 54 | 106 | 72 | 13 | A |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printed material comprising:

a recording medium having a pressure-bonding surface including an image portion and a pressure phase transition layer, the recording medium being folded upon itself and pressure-bonded; or a recording medium having a pressure-bonding surface including an image portion and a pressure phase transition layer and an additional recording medium, the recording medium and the additional recording medium being stacked and pressure-bonded together, wherein, before the recording medium is folded upon itself and pressure-bonded or before the recording medium and the additional recording medium are stacked and pressure-bonded together, an average thickness of the pressure phase transition layer on the image portion of the pressure-bonding surface of the recording medium is larger than an average thickness of the pressure phase transition layer on a non-image portion of the pressure-bonding surface of the recording medium, wherein the printed material comprises a portion where a thickness of the pressure phase transition layer on the image portion is greater than a thickness of the pressure phase transition layer in another portion of the printed material, and wherein a thickness of the image portion in the portion of the printed material is greater than a thickness of the image portion in the another portion of the printed material.

2. The printed material according to claim 1, wherein the average thickness of the pressure phase transition layer on the image portion is from 0.5 μm to 5.0 μm inclusive, wherein the average thickness of the image portion is more than 0 μm and 5.0 μm or less, and wherein, when the thickness BR of the image portion is 0.5 μm or less, the following formulas (1) to (3) are satisfied:

$$AR=X1\times BR+Y1; \quad \text{formula (1):}$$

$$2\leq X1\leq 10; \text{ and} \quad \text{formula (2):}$$

$$0.5\leq Y1\leq 2 \quad \text{formula (3):}$$

wherein AR is the thickness in micrometers of the pressure phase transition layer on the image portion; BR is the thickness in micrometers of the image portion; and the thicknesses represented by AR and BR are the thickness of the pressure phase transition layer directly above the image portion and the thickness of the image portion directly below the pressure phase transition layer whose thickness is determined, respectively.

3. The printed material according to claim 1, wherein coverage of the image portion with the pressure phase transition layer thereon is from 60% to 100% inclusive.

4. The printed material according to claim 3, wherein coverage of the non-image portion with the pressure phase transition layer thereon is from 10% to 60% inclusive.

5. The printed material according to claim 1, wherein the image portion is a toner image portion.

6. The printed material according to claim 1, wherein the pressure phase transition layer contains: a styrene-based resin containing styrene and an additional vinyl monomer as polymerization components; and a (meth)acrylate-based resin containing at least two (meth)acrylates as polymerization components such that the mass percentage of the (meth)acrylates with respect to the total mass of the polymerization components of the (meth)acrylate-based resin is 90% by mass or more, the pressure phase transition layer having at least two glass transition temperatures, and wherein, among the glass transition temperatures of the pressure phase transition layer, the difference between the lowest glass transition temperature and the highest glass transition temperature is 30° C. or more.

7. The printed material according to claim 6, wherein the mass percentage of the styrene with respect to the total mass of the polymerization components of the styrene-based resin is from 60% by mass to 95% by mass inclusive.

8. The printed material according to claim 6, wherein the mass ratio of two (meth)acrylates with the highest mass percentages among the at least two (meth)acrylates included as the polymerization components of the (meth)acrylate-based resin is 80:20 to 20:80.

* * * * *